(12) United States Patent
Ruelke et al.

(10) Patent No.: US 12,120,536 B2
(45) Date of Patent: *Oct. 15, 2024

(54) MIXED MODE WIRELESS COMMUNICATION SYSTEM OPERATIONAL ENVIRONMENT

(71) Applicant: MOTOROLA SOLUTIONS, INC., Chicago, IL (US)

(72) Inventors: Charles R. Ruelke, Coral Springs, FL (US); Hyungjae Cho, Northbrook, IL (US); KiYoun Cho, Arlington Heights, IL (US); Antonio Faraone, Fort Lauderdale, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 294 days.

This patent is subject to a terminal disclaimer.

(21) Appl. No.: 17/657,559

(22) Filed: Mar. 31, 2022

(65) Prior Publication Data

US 2022/0240108 A1 Jul. 28, 2022

Related U.S. Application Data

(63) Continuation of application No. 17/161,340, filed on Jan. 28, 2021, now Pat. No. 11,343,687.

(51) Int. Cl.
*H04W 24/04* (2009.01)
*H04W 4/06* (2009.01)
(Continued)

(52) U.S. Cl.
CPC .......... *H04W 24/04* (2013.01); *H04W 4/06* (2013.01); *H04W 16/26* (2013.01); *H04W 64/003* (2013.01); *H04W 88/10* (2013.01)

(58) Field of Classification Search
CPC ....... H04W 24/04; H04W 4/06; H04W 16/26; H04W 64/003; H04W 88/10; H04W 48/18; H04W 48/12; H04W 84/08
See application file for complete search history.

(56) References Cited

U.S. PATENT DOCUMENTS

| | | |
|---|---|---|
| 7,082,303 B2 | 7/2006 | Sayeedi et al. |
| 7,801,526 B2 | 9/2010 | Newberg et al. |

(Continued)

FOREIGN PATENT DOCUMENTS

WO 2016126824 A1 8/2016

OTHER PUBLICATIONS

A. Kumbhar, F. Koohifar, i. Guven<;: and B. Mueller, "A Survey on Legacy and Emerging Technologies for Public Safety Communications," in IEEE Communications Surveys & Tutorials, vol. 19, No. 1, pp. 97-124, Firstquarter 2017, doi: 10.1109/COMST .2016. 2612223. (Year: 2016).

(Continued)

*Primary Examiner* — Mazda Sabouri
(74) *Attorney, Agent, or Firm* — Michael Best & Friedrich LLP

(57) ABSTRACT

One example Land Mobile Radio (LMR) base station includes a network interface and an electronic processor. The electronic processor is configured to receive profile information of a plurality of fifth generation (5G)/Long Term Evolution (LTE) communication devices. The profile information of the plurality of 5G/LTE communication devices may be transmitted (i) over a background gateway communication channel to an LMR communication network (Continued)

that includes the LMR base station and (ii) in response to the 5G/LTE software defined network detecting a fault condition of the first 5G/LTE communication network. The electronic processor is further configured to broadcast a capture beacon based on the profile information and compliant with at least some characteristics of a 5G/LTE communication protocol. The capture beacon is configured to be received by the 5G/LTE communication device to reconfigure the 5G/LTE communication device for communication compliant with an LMR communication protocol.

20 Claims, 6 Drawing Sheets

(51) Int. Cl.
 *H04W 16/26* (2009.01)
 *H04W 64/00* (2009.01)
 *H04W 88/10* (2009.01)

(56) References Cited

U.S. PATENT DOCUMENTS

| | | |
|---|---|---|
| 8,279,765 B2 | 10/2012 | Sayeedi |
| 9,148,846 B2 | 9/2015 | Niass et al. |
| 9,648,641 B2 | 5/2017 | Sun et al. |
| 9,900,801 B2 | 2/2018 | Papa et al. |
| 9,924,430 B2 | 3/2018 | Liang et al. |
| 10,735,180 B2 | 8/2020 | Bockrath et al. |
| 2013/0272134 A1* | 10/2013 | Miller .................... H04L 63/205 370/328 |
| 2013/0337771 A1* | 12/2013 | Klein ...................... H04W 4/90 455/411 |
| 2014/0321444 A1 | 10/2014 | Klein |
| 2015/0201328 A1 | 7/2015 | Klein et al. |
| 2017/0201895 A1 | 7/2017 | Hassan et al. |

OTHER PUBLICATIONS

International Search Report and Written Opinion for Application No. PCT/US2022/070067 dated Apr. 20, 2022 (10 pages).

* cited by examiner

MIXED MODE WIRELESS COMMUNICATION SYSTEM OPERATIONAL ENVIRONMENT

RELATED APPLICATIONS

The present patent application is a continuation of U.S. application Ser. No. 15/161,340, filed Jan. 28, 2021, the entire content of which is incorporated by reference.

BACKGROUND OF THE INVENTION

Communication devices may be configured to wirelessly communicate with other communication devices and/or other external devices over a wireless communication network. However, network coverage of the wireless communication network may not exist in some locations due to remoteness of location, malfunctioning of network equipment, damaged network equipment, overloading of the wireless communication network due to a high number of communication devices communicating or attempting to communicate over the wireless communication network, and/or the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
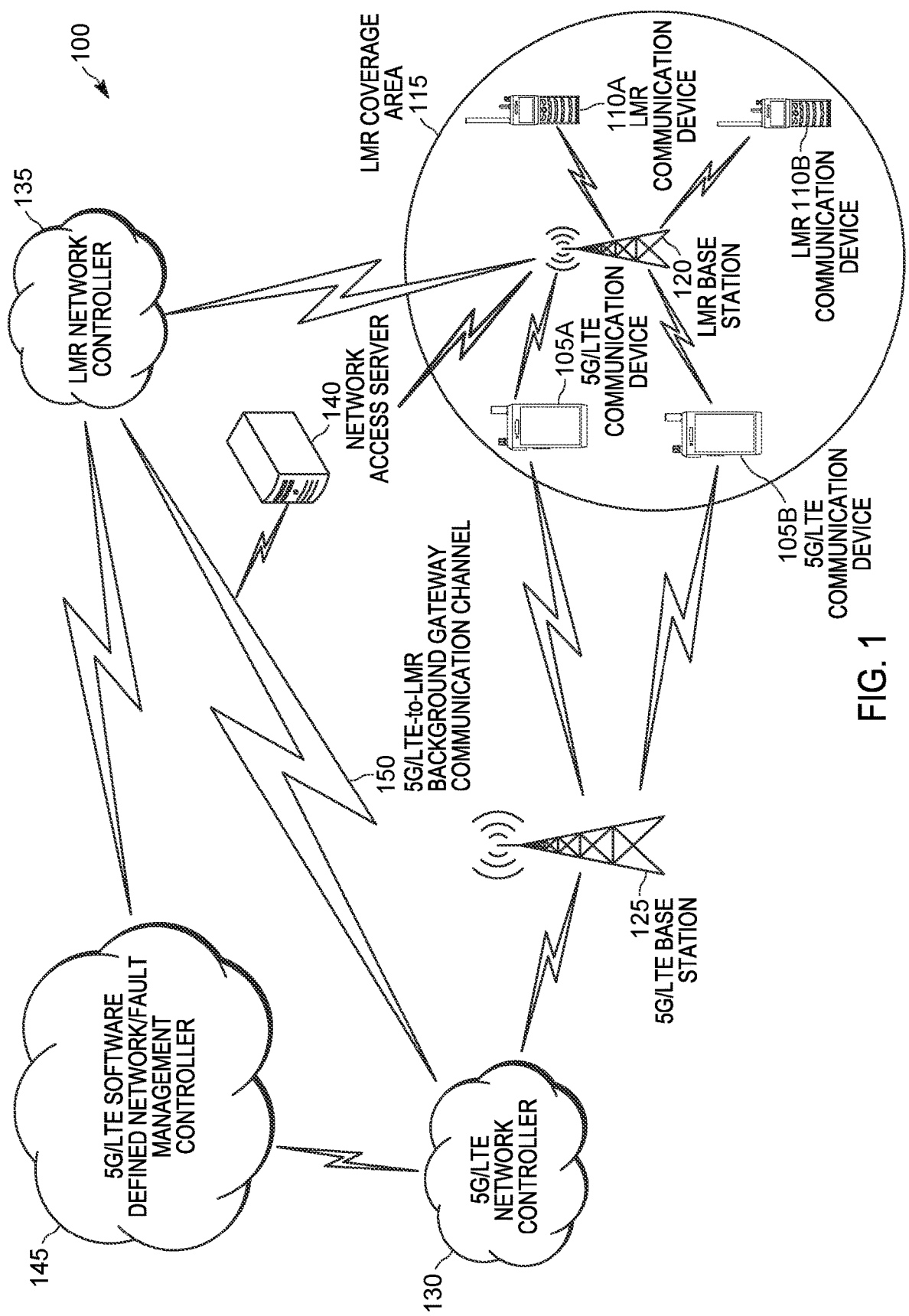
FIG. 1 is a diagram of a communication system that includes multiple types of communication networks according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Radio Access Networks (RANs) provide radio communication links for communications through a network between a plurality of user terminals. Such user terminals, if mobile, are known as communication devices, mobile stations, subscriber devices, or user equipment (UEs), which may provide uplink data and control signaling to the RAN and receive data and control signaling from the RAN. A RAN depends on the generation of the network, e.g., evolved NodeBs (eNBs) in a fourth generation (4G) network or fifth generation (5G) NodeBs (gNBs) in a 5G network, may serve the UEs in one or more cells indicative of a coverage area of the eNB s and gNBs. The eNBs and gNBs also may be referred to as base stations. Network-based communication use has increased due to an increase in the types of devices using network resources, due to the introduction of a massive number of machine type communication (MTC) UEs, and due to increased volume of data and associated wider bandwidth protocols used by various applications operated on various UEs, prompting development of the 5G third generation partnership project (3GPP) protocol.

RANs may operate according to an industry standard protocol such as Long-Term Evolution (LTE) or 5G, with other protocols running in conjunction with these protocols. These other protocols may include, for example, an open media alliance (OMA) push-to-talk (PTT) over cellular (OMA-PoC) standard or Mission Critical push-to-talk (MCPTT) standard, a voice over IP (VoIP) standard, or a PTT over IP (PoIP) standard. Typically, protocols such as PoC, VoIP, and PoIP are implemented over 3GPP LTE networks. RANs may additionally or alternatively operate according to an industry standard land mobile radio (LMR) protocol such as, for example, the Project 25 (P25) standard defined by the Association of Public Safety Communications Officials International (APCO), or other radio protocols, such as the Terrestrial Trunked Radio (TETRA) standard defined by the European Telecommunication Standards Institute (ETSI), the Digital Private Mobile Radio (dPMR) standard also defined by ETSI, or the Digital Mobile Radio (DMR) standard also defined by ETSI.

The OMA-PoC or MCPTT standards enable PTT as well as "instant on" features of half duplex broadband UEs. One of the situations in which the use of PTT communications is extensive involves emergency first responders at incident scenes. In many cases, first responders from different agencies (e.g., police, fire, emergency medical technicians (EMT), hazardous materials (hazmat) officers) converge at an incident scene. However, the incident scene may be located at a remote location that is not within a coverage area of a 5G/LTE network (i.e., not located within communication range of at least a 5G/LTE base station). A similarly problematic situation may arise when the location of the emergency incident scene is within communication range of a 5G/LTE base station that begins malfunctioning or becomes damaged and is therefore not functioning properly (i.e., experiencing a fault condition). In this situation, UEs at the scene may not be able to communicate over the 5G/LTE network or with remote UEs or with each other in another manner. For example, 5G/LTE UEs may be configured to communicate with each other solely through a 5G/LTE network. In other words, 5G/LTE UEs may not be configured to communicate directly with each other (i.e., device-to-device communication) or through another type of base station without the communication being routed through a 5G/LTE base station. Therefore, 5G/LTE UEs may not be able to communicate with each other when operating in a remote location that is outside of a communication range of at least a 5G/LTE base station or when a nearby 5G/LTE base station is experiencing a fault condition. Accordingly, there is a technological problem with respect to the communication capabilities of 5G/LTE UEs when 5G/LTE network coverage is unavailable.

To address this technological problem, disclosed are, among other things, methods, devices, and systems to operate 5G/LTE UEs in a mixed mode LMR/5G operating environment. When 5G/LTE network coverage is unavailable, a 5G/LTE-only UE may revert to a hybrid LMR communication mode, assuming that LMR network coverage is available, for example, from a nearby properly-functioning LMR base station. It is also assumed that the LMR network may access a network backbone to access 5G/LTE profile information of 5G/LTE UEs. Using the profile information, the LMR network may allow the 5G/LTE UE to reconfigure itself in the hybrid LMR communication mode to communicate with other 5G/LTE UEs, LMR UEs, or both using a voice only (i.e., slow data) fail safe communication system (i.e., a backup communication system) over the LMR network. Such communications may occur directly between UEs without passing through the LMR base station (i.e., direct device-to-device communication) or may occur between UEs via communication passing through the LMR base station. In either situation, such communications may occur according to an LMR communication protocol. Once the 5G/LTE network coverage again becomes available, the 5G/LTE UEs may revert to 5G/LTE communication mode to communicate with each other, with LMR UEs, or both according to a 5G/LTE communication protocol and through a 5G/LTE base station and any backbone interconnection with the LMR network.

Accordingly, the methods, devices, and systems disclosed herein address the above-noted technological problem by providing a backup communication network that allows 5G/LTE-only UEs to communicate with other 5G/LTE-only UEs, LMR UEs, or both when the 5G/LTE network is experiencing a fault condition or the 5G/LTE-only UEs are outside the 5G/LTE network coverage area. The 5G/LTE UEs may prioritize the use of 5G/LTE communications when available and use LMR communications when a 5G/LTE communication network is not available.

One embodiment provides a Land Mobile Radio (LMR) base station that may include a network interface configured to communicate with a plurality of LMR communication devices. Two or more of the LMR communication devices may be configured to engage in wireless voice communication with each other. The LMR base station may also include an electronic processor coupled to the network interface. The electronic processor may be configured to receive, via the network interface, profile information of a plurality of fifth generation (5G)/Long Term Evolution (LTE) communication devices. The 5G/LTE communication devices may be configured to engage in wireless communication with each other over a first 5G/LTE communication network including a plurality of 5G/LTE base stations. The profile information of the plurality of 5G/LTE communication devices may be transmitted by a 5G/LTE software defined network (i) over a background gateway communication channel to an LMR communication network that includes the LMR base station and (ii) in response to the 5G/LTE software defined network detecting a fault condition of the first 5G/LTE communication network. The electronic processor may be further configured to in response to receiving the profile information of the plurality of 5G/LTE communication devices, broadcast, via the network interface, a capture beacon based on the profile information and compliant with at least some characteristics of a 5G/LTE communication protocol used by a 5G/LTE base station to communicate with a 5G/LTE communication device. The capture beacon may be configured to be received by the 5G/LTE communication device to reconfigure the 5G/LTE communication device for communication compliant with an LMR communication protocol. The electronic processor may be further configured to operate according to the LMR communication protocol such that the LMR communication network serves as a backup communication network that allows the 5G/LTE communication device to engage in wireless voice communication with another 5G/LTE communication device, with an LMR communication device, or both.

Another embodiment provides a method of controlling a Land Mobile Radio (LMR) base station. The method may include receiving, with an electronic processor of the LMR base station via a network interface of the LMR base station, profile information of a plurality of fifth generation (5G)/Long Term Evolution (LTE) communication devices. The network interface may be configured to communicate with a plurality of LMR communication devices, two or more of which may be configured to engage in wireless voice communication with each other. The 5G/LTE communication devices may be configured to engage in wireless communication with each other over a first 5G/LTE communication network including a plurality of 5G/LTE base stations. The profile information of the plurality of 5G/LTE communication devices may be transmitted by a 5G/LTE software defined network (i) over a background gateway communication channel to an LMR communication network that includes the LMR base station and (ii) in response to the 5G/LTE software defined network detecting a fault condition of the first 5G/LTE communication network. The method may further include in response to receiving the profile information of the plurality of 5G/LTE communication devices, broadcasting, with the electronic processor and via the network interface, a capture beacon based on the profile information and compliant with at least some characteristics of a 5G/LTE communication protocol used by a 5G/LTE base station to communicate with a 5G/LTE communication device. The capture beacon may be configured to be received by the 5G/LTE communication device to reconfigure the 5G/LTE communication device for communication compliant with an LMR communication protocol. The method may further include operating, with the electronic processor and the network interface, according to the LMR communication protocol such that the LMR communication network serves as a backup communication network that allows the 5G/LTE communication device to engage in wireless voice communication with another 5G/LTE communication device, with an LMR communication device, or both.

Another embodiment provides a communication system that may include a first fifth generation (5G)/Long-Term Evolution (LTE) communication network including a plurality of 5G/LTE base stations configured to support wireless communication between two or more of a plurality of 5G/LTE communication devices. The communication system may also include a Land Mobile Radio (LMR) communication network including a plurality of LMR base stations configured to support wireless voice communication between two or more of a plurality of LMR communication devices. The communication system may also include a 5G/LTE software defined network implemented by a first electronic processor. The first electronic processor may be configured to execute a fault detection protocol to detect a fault condition of the first 5G/LTE communication network. The first electronic processor may also be configured to in response to detecting the fault condition of the first 5G/LTE communication network, (i) establish a background gateway communication channel to the LMR communication network, and (ii) transmit profile information of the plurality of 5G/LTE communication devices to the LMR communication network. An LMR base station of the plurality of LMR base stations may include a second electronic processor that may be configured to receive the profile information of the plurality of 5G/LTE communication devices. The second electronic processor may be further configured to in response to receiving the profile information of the plurality of 5G/LTE communication devices, broadcast a capture beacon based on the profile information and compliant with at least some characteristics of a 5G/LTE communication protocol used by a 5G/LTE base station to communicate with a 5G/LTE communication device. The capture beacon may be configured to be received by the 5G/LTE communication device to reconfigure the 5G/LTE communication device for communication compliant with an LMR communication protocol. The second electronic processor may be further configured to operate according to the LMR communication protocol such that the LMR communication network serves as a backup communication network that allows the 5G/LTE communication device to engage in wireless voice communication with another 5G/LTE communication device, with an LMR communication device, or both.

Another embodiment provides a fifth generation (5G)/Long-Term Evolution (LTE) communication device that may include a network interface that may be configured to communicate over 5G/LTE communication networks and that may be configured to communicate over Land Mobile Radio (LMR) communication networks. The 5G/LTE communication device may further include an electronic processor that may be configured to engage in a 5G/LTE network scanning process to attempt to identify a second operational 5G/LTE communication network while a first 5G/LTE communication network is experiencing a fault condition. The electronic processor may be further configured to receive a capture beacon from an LMR base station of an LMR communication network during the 5G/LTE network scanning process. The capture beacon may be broadcasted to be compliant with at least some characteristics of a 5G/LTE communication protocol configured to be used by a 5G/LTE base station of the first 5G/LTE communication network configured to communicate with the 5G/LTE communication device. The capture beacon may include an operation code configured to indicate that the first 5G/LTE communication network has experienced the fault condition. The electronic processor may be further configured to in response to receiving the capture beacon and identifying the operation code, reconfigure the 5G/LTE communication device to engage in wireless voice communication with another 5G/LTE communication device, with an LMR communication device, or both over the LMR communication network serving as a backup communication network using an LMR communication protocol instead of over the first 5G/LTE communication network using the 5G/LTE communication protocol.

For ease of description, some or all of the example systems and devices presented herein are illustrated with a single example of each of its component parts. Some examples may not describe or illustrate all components of the systems or devices. Other example embodiments may include more or fewer of each of the illustrated components, may combine some components, or may include additional or alternative components.

FIG. 1 is a diagram of a communication system 100 that includes multiple types of communication networks according to one example embodiment. In the example illustrated, the communication system 100 includes 5G/LTE communication devices (UEs) 105A and 105B. In some embodiments, the 5G/LTE communication devices 105 are configured to primarily engage in communication over a 5G network, over an LTE network, or both. The communication system 100 may also include LMR communication devices (UEs) 110A and 110B configured to engage in communication over an LMR network. In the following description, when explaining how a single communication device functions, a reference to communication device 105 or 110 is used. It is not necessary, however, that the communication devices 105A and 105B are identical or that the communication devices 110A and 110B are identical. The communication devices 105A, 105B, 110A, and 110B are merely examples. In some embodiments, the communication system 100 may include more or fewer communication devices 105 and 110 than illustrated in FIG. 1.

In some embodiments, the communication devices 105 and 110 are located within an LMR coverage area 115. In other embodiments, the communication devices 105 may be located outside the LMR coverage area 115 but adjacent to/nearby the LMR coverage area 115. The LMR coverage area 115 may be defined based on a communication range of an LMR base station 120. In other words, the communication devices 105 and 110 within the LMR coverage area 115 may be capable of communicating with the LMR base station 120 when configured to do so. In the example illustrated in FIG. 1, the communication system 100 also includes a 5G/LTE base station 125. Although not shown in FIG. 1, the 5G/LTE base station 125 may include its own coverage area. In some embodiments, the coverage area of the 5G/LTE base station 125 overlaps with and/or is adjacent to the LMR coverage area 115 of the LMR base station 120. In some embodiments, one or more of the 5G/LTE communication devices 105 and/or one or more of the LMR communication devices 110 are located within both the LMR coverage area 115 and the coverage area of the 5G/LTE base station 125. Although only one of each base station 120 and 125 is shown in FIG. 1, in other embodiments, the communication system 100 may include additional base stations 120 and 125.

As shown in the example illustrated in FIG. 1, the communication system 100 also includes a 5G/LTE network controller 130. In some embodiments, the 5G/LTE network controller 130 is configured to store data related to a 5G/LTE communication network and manage operations of the 5G/LTE base stations 125 included in the 5G/LTE communication network (i.e., control the 5G/LTE communication network to operate according to the 5G/LTE communication protocol). In some embodiments, the 5G/LTE network controller 130 may include a server that includes a memory device/system configured to store profile information (e.g., including identification information, connection information, and/or the like) of the 5G/LTE communication devices 105 and information about the 5G/LTE communication protocol (e.g., 5G/LTE frequency spectrum information indicating spectrum usage information of the 5G/LTE communication network). In some embodiments, the 5G/LTE network controller 130 utilizes an evolved packet core (EPC) that includes mobility management entities (MME), serving gateways (S-GWs), and packet data network gateways (P-GWs), among others. In some embodiments, the MME controls setup, configuration, establishment, and release of wireless communication links over the 5G/LTE communication network by the 5G/LTE communication devices 105. In some embodiments, the 5G/LTE network controller implements an LTE centric protocol (e.g. a Non-Access Stratum (NAS) protocol, a radio resource control (RRC) protocol, or the like). In some embodiments, the LTE centric protocol helps manage LTE functions and may also be used to push information associated with the 5G/LTE communication devices 105 to the LMR base station 120.

In some embodiments, the 5G/LTE communication network includes the 5G/LTE network controller 130, the 5G/LTE base stations 125, the 5G/LTE communication devices 105, and any other devices used to allow the 5G/LTE communication devices 105 to communicate with each other and with other devices. In some embodiments, the 5G/LTE communication network is capable of communicating data such as streaming, downloading, and uploading audio data, video data, voice data, text data, and/or the like between the 5G/LTE communication devices 105 and other devices.

In some embodiments, the communication system 100 also includes an LMR network controller 135. In some embodiments, the LMR network controller 135 may function similarly with respect to an LMR communication network as the 5G/LTE network controller 130 functions with respect to the 5G/LTE communication network. In some embodiments, the LMR network controller 135 is configured to store data related to the 5G/LTE communication network and manage operations of the LMR base stations 120 included in the LMR communication network (i.e., control the LMR communication network to operate according to the LMR communication protocol). In some embodiments, the LMR network controller 135 may include a server that utilizes a memory configured to store profile information (e.g., including identification information, connection information, and/or the like) of the LMR communication devices 110 and/or the 5G/LTE communication devices 105. In some embodiments, profile information about the 5G/LTE communication devices 105 is stored in a separate network access server 140 associated with the LMR communication network as explained in greater detail herein. In such embodiments, the network access server 140 may be a second server configured to receive and store the profile information of the plurality of 5G/LTE communication devices 105 while a first server of the LMR network controller 135 is configured to store profile information of the plurality of LMR communication devices 110.

In some embodiments, the LMR communication network includes the LMR network controller 135, the LMR base stations 120, the LMR communication devices 110, and any other devices used to allow the LMR communication devices 110 to communicate with each other and with other devices (e.g., optionally the network access server 140). In some embodiments, the LMR communication network is capable of communicating voice data (i.e., slow data) between the LMR communication devices 110 and other devices. As explained herein, in some embodiments, the 5G/LTE communication devices 105 may be configured to temporarily communicate with each other, with the LMR communication devices 110, or both over the LMR communication network or directly.

In some embodiments, the communication system 100 also includes a 5G/LTE software defined network 145 (i.e., fault management controller 145) that may be configured to communicate with the 5G/LTE network controller 130 and the LMR network controller 135 wirelessly by means of a wireless interface connection or through a wired connection (e.g., a ground based internet centric digital packet communication system). In some embodiments, the 5G/LTE software defined network 145 is configured to detect a fault condition of the 5G/LTE communication network and, in response thereto, establish a 5G/LTE-to-LMR background (e.g., alternate accessible) gateway communication channel 150 between the 5G/LTE communication network and the LMR communication network as explained herein. As indicated in FIG. 1, the 5G/LTE-to-LMR communication channel 150 may be established between the 5G/LTE network controller 130 and the LMR network controller 135 or the network access server 140. While the network access server 140 is shown separately from the LMR network controller 135 in FIG. 1, in some embodiments, the network access server 140 may be integrated into the LMR network controller 135. The background gateway communication channel 150 may be established as a wireless or wired connection as indicated above. For example, the 5G/LTE-to-LMR communication channel 150 may be a wireless interface governed by an Air-Interface-Protocol (AIP) unique from the AIP governing 5G/LTE base station 125 or LMR base station 120. Alternatively, the 5G/LTE-to-LMR communication channel 150 may be a wired connection using an internet centric hardware based packet switched network that links network controller 130 and 135. Either or both instantiations of channel 150 may be incorporated into embodiments of the communication system 100.

In some embodiments, one or more of the 5G/LTE network controller 130, the LMR network controller 135, and the 5G/LTE software defined network 145 (i.e., fault management controller 145) are implemented as a discrete network element on a dedicated hardware, as a software instance running on dedicated hardware, or as a virtualized function instantiated on an appropriate platform, e.g., dedicated hardware or a cloud infrastructure. In some embodiments, the one or more of the elements 130, 135, and 145 include a cloud-based electronic computing device or cloud-based server that includes or is implemented by an electronic processor. In some embodiments, the cloud-based electronic computing device performs the functionality of all of the elements 130, 135, and 145. In other words, while the elements 130, 135, and 145 are shown logically as separate elements in FIG. 1, a cloud-based electronic computing device may perform the corresponding functionality of each element 130, 135, and 145.

Note that various specialized servers are not shown in FIG. 1 for convenience. For example, a PTT server may be present to provide floor control (e.g., control access to communication devices 105 by granting or denying resources of the PTT server and controlling data flow between the PTT server and the communication devices 105) in an OMA-PoC or MCPTT session. When a PTT (hard or soft) button on a communication device 105 that has subscribed to the OMA-PoC or MCPTT session is actuated, the communication device 105 may transmit a request for permission in the OMA-PoC or MCPTT session to the PTT server using, for example, a real-time transport protocol (RTP) message. If the PoC session is not occupied (i.e., there are no other communication devices 105 transmitting when the PTT button is actuated), the PTT server may transmit an acceptance message to the communication device 105, which can then begin transmitting encoded audio and/or video data (which may be compressed) to the PTT server over the RTP or IP protocol. The PTT server may then send the audio and/or video data to one or more other communication devices 105 that have subscribed to the PoC session using unicast, multicast, or broadcast communications.

In some embodiments, for normal (e.g., non-fault) operating conditions, communication devices 105, 110 may be partitioned into separate work groups. In some LMR cases, each group of communication devices 110 may be assigned a particular frequency (channel) for communication between the plurality of communication devices 110 within a shared group. The channel used by each group may be unique or may be shared with another group. In the latter case, a group ID may be used during transmission to enable distinguishing between groups for transmissions. In some 5G/LTE systems, when operating in normal operating conditions (e.g., non-fault), a plurality of communication devices 105 may operate on a shared spectrum with varying bandwidth allocations for individual communication devices 105 based on transmission data rates and priority, wherein said spectrum assigned to the 5G/LTE system is not shared with LMR systems and is not compatible with nominal LMR operating conditions. However, for a fault condition of the 5G/LTE system, the 5G/LTE communication devices 105 and LMR communication devices 110 may be configured for communication over a shared spectrum with appropriately scaled channel (e.g., bandwidth) allocations as will be described herein. Alternately, fault condition communication between 5G/LTE communication devices 105 and LMR communication devices 110 operating at different spectrums may be accomplished using a fault centric repeater operation at LMR base stations 120 as will be described herein.

In other trunked LMR systems, a pool of frequencies may be shared among all groups, allowing more flexibility in resource usage for the pool among the groups as some groups with more communications are able to expand channel usage while other groups with fewer communications are able to use the channels less often. That is, when a group member activates the PTT button, a call request that is associated with the group ID may be transmitted to the PTT server on a control channel. The control channel may be a particular frequency that remains idle until a call request is transmitted. Each communication device 105, 110 may monitor the control channel for a new call notification. The PTT server may receive the call request and in response assign a specific channel for the requested group call and send the assignment to communication devices 105, 110 associated with the group ID. This may permit the group communication devices 105, 110 to move from the control channel to the assigned channel.

In some embodiments, the communication devices 105, 110 communicate with each other over one of the communication networks described previously herein (for example, by sending and receiving radio signals to and from a base station 120, 125 or the like). The communication networks may include wireless and wired portions. All or parts of the communication networks may be implemented using various existing or future-developed specifications or protocols.

In some embodiments, one communication network is implemented using a direct-mode, conventional, or trunked land mobile radio (LMR) standard or protocol, for example, European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In some embodiments, another communication network implements the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented. The communication networks may also include future developed networks. In some embodiments, the communication networks may also include a combination of the networks mentioned. In some embodiments, the communication devices 105, 110 may communicate directly with each other using a communication channel or connection that is outside of the communication networks. For example, at least some of the communication devices 105, 110 may communicate directly with each other when they are within a predetermined distance from each other using short-range communication mechanisms such as Bluetooth® links.

As illustrated in FIG. 1, the communication device 105, 110 may be a handheld communication device, for example, a mobile telephone or other portable communication device, mobile vehicular radio, laptop computer, tablet computer, smart watch or other smart wearable, and may be located in or be a part of a drone or unmanned aerial vehicle, or may be another device configured to communicate over the communication network described previously herein. In some embodiments, the communication device 105, 110 may be a handheld radio carried by a public safety officer or first responder, such as a police officer. In some embodiments, the communication device 105, 110 may be a mobile communication device mounted in or on a vehicle (for example, a police vehicle, an ambulance, or the like). In some embodiments, the communication device 105, 110 may be a device maintained, for example, at a call center or public safety command center (for example, a desktop computer).

As indicated in FIG. 1, in some embodiments, the 5G/LTE communication devices 105 may be different than the LMR communication devices 110. For example, the 5G/LTE communication devices 105 may include a touchscreen and may be configured to transmit and receive multiple different types of data (e.g., voice data, video data, text data, etc.) while operating within different RF spectrum, whereby the wireless communication is governed using different protocols and modulation strategies (e.g., interleaved harmonized differential quadrature phase shift keying (HDQPSK), time-division multiplexing (TDM), frequency shift keying (FSK), trunking, etc.). On the other hand, the LMR communication devices 110 may not necessarily include a touchscreen and may be configured to transmit and receive a limited type(s) of data (e.g., only voice data). These limitations are merely examples. In some embodiments, the 5G/LTE communication devices 105 may include similar components and functionality (e.g., data communication capabilities) as the LMR communication devices 110.

FIG. 1 illustrates only one example embodiment of the communication system 100. In other embodiments, the system 100 may include more or fewer components and may perform functions that are not explicitly described herein. For example, the communication system 100 may include additional communication devices 105, 110 and base stations 120, 125. Further, in some embodiments, one or more devices of the communication system 100 are combined into a single device. For example, the 5G/LTE software defined network 145 (i.e., fault management controller 145) and the 5G/LTE network controller 130 may be combined into a single device that performs the functions of both devices that are described herein and that may be one of multiple cloud electronic computing devices included in the communication system 100. The lightning bolts in FIG. 1 represent communication capability between devices shown in FIG. 1. Such communication may occur wirelessly in some situations and may occur over wired connections between the devices in other situations.

Figure 2:
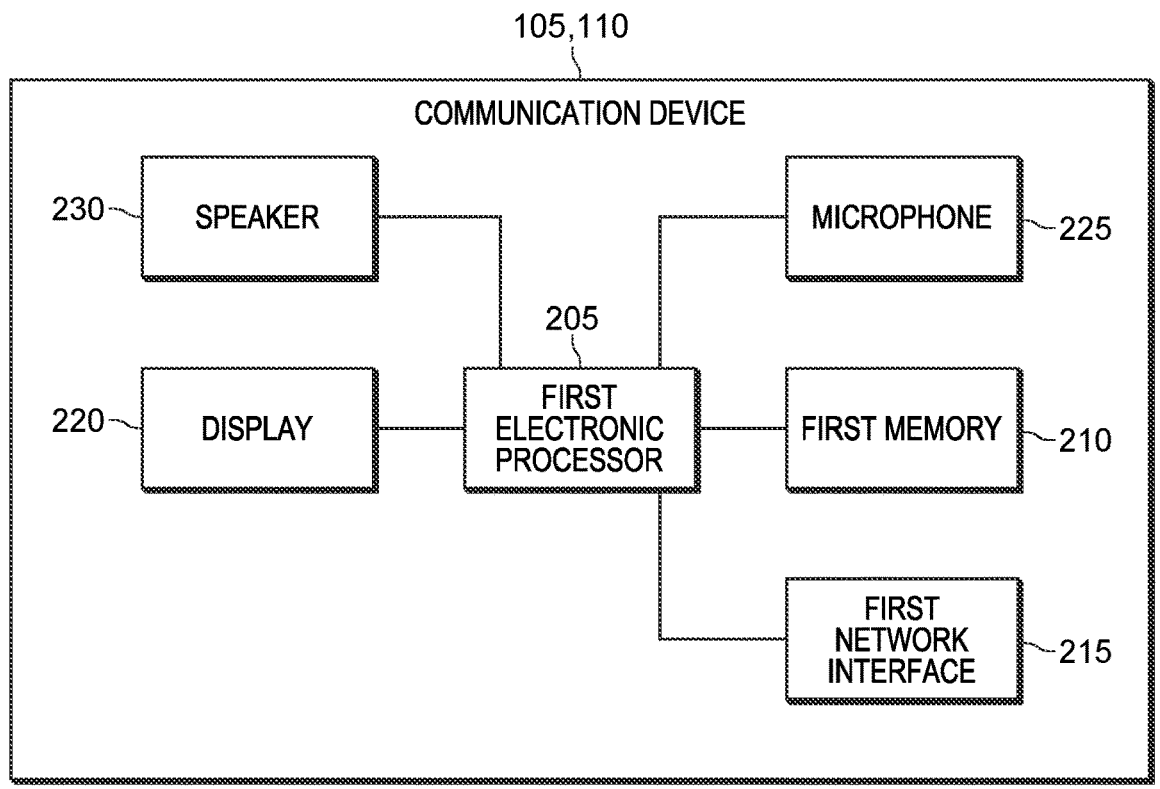
FIG. 2 is a block diagram of a communication device included in the communication system of FIG. 1 according to one example embodiment.

FIG. 2 is a block diagram of a communication device 105, 110 of the communication system 100 according to one example embodiment. In the example shown, the communication device 105, 110 includes a first electronic processor 205 (for example, a microprocessor or another electronic device). The first electronic processor 205 may include input and output interfaces (not shown) and be electrically connected to a first memory 210, a first network interface 215 including, for example, a radio frequency (RF) transceiver and an RF antenna, a display 220, a microphone 225, and a speaker 230.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform at least some of the methods described herein.

Depending on a type of communication device 105, 110, the first memory 210 may be programmed to include different software/firmware options that are executable by the first electronic processor 205. Additionally, depending on a type of communication device 105, 110, the first network interface 215 may be configured to communicate over one or more different wireless communication networks (e.g., a 5G/LTE communication network, an LMR communication network, both, or the like). For example, the first network interface 215 may include multiple transceivers and/or multiple antennas to allow for communication over different types of wireless communication networks. In some embodiments, the first network interface 215 includes multiple transceivers to allow for communication over different types of wireless communication networks but each transceiver may be configured to use the same antenna to engage in such communications. In some embodiments, a single transceiver may be configured to allow for communication over different types of wireless communication networks.

The first network interface 215 may send and receive data to and from other devices in the communication system 100 (for example, over the communication networks described previously herein). For example, the first network interface 215 includes a wireless communication transceiver and an antenna for wirelessly communicating with other devices. Alternatively or in addition, the first network interface 215 may include a connector or port for receiving a wired connection to one or more communication networks, such as an Ethernet cable. The first electronic processor 205 receives electrical signals representing sound from the microphone 225 and may communicate information relating to the electrical signals to other devices through the first network interface 215 (for example, to another communication device 105, 110). Similarly, the first electronic processor 205 may output data received via the first network interface 215, for example from another communication device 105, 110, through the speaker 230, the display 220 (which may include a touchscreen), or a combination thereof.

In some embodiments, the communication device 105, 110 may include fewer or additional components in configurations different from that illustrated in FIG. 2. For example, in some embodiments, the communication device 105, 110 also includes one or more of a camera, a location component (for example, a global positioning system (GPS) receiver), and a push-to-talk (PTT) mechanism/button. In some embodiments, the communication device 105, 110 performs additional functionality than the functionality described below.

Similar to the software/firmware options described previously herein, depending on a type of communication device 105, 110, the communication device 105, 110 may include different hardware components. For example, as explained previously herein, the 5G/LTE communication devices 105 may include a touchscreen and may be configured to transmit and receive multiple different types of data (e.g., voice data, video data, text data, etc.). On the other hand, the LMR communication devices 110 may not necessarily include a touchscreen and may be configured to transmit and receive a limited type(s) of data (e.g., voice data).

Figure 3:
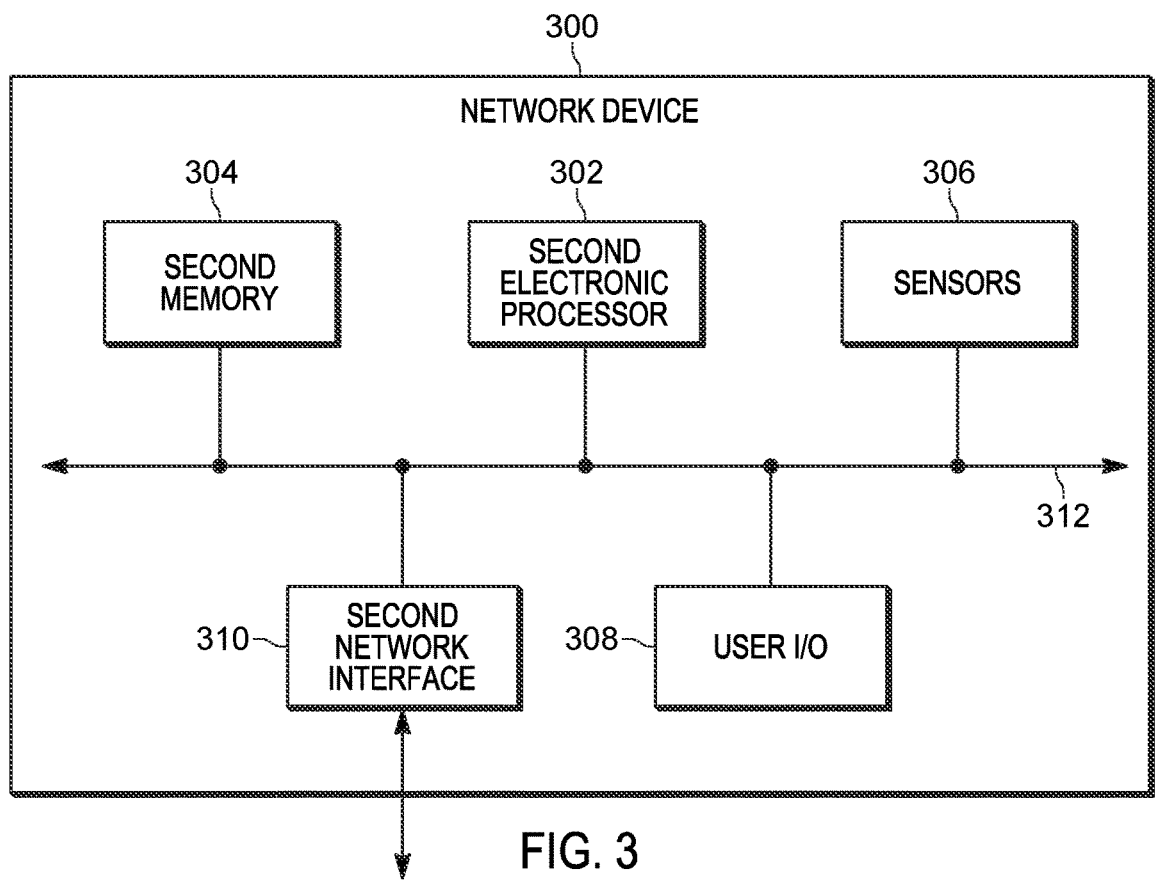
FIG. 3 is a block diagram of a network device included in the communication system of FIG. 1 according to one example embodiment.

FIG. 3 is a block diagram of a network device 300 according to one example embodiment. In some embodiments, the network device 300 may be a personal device, such as the communication device 105, 110, or a network device, such as one or more of those described in relation to FIG. 1 (e.g., base station 120, 125, 5G/LTE network controller 130, LMR network controller 135, network access server 140, 5G/LTE software defined network 145 (i.e., fault management controller 145), or other equipment used in the network environment). The network device 300 may include a physical device and/or a virtual device, such as a server running one or more virtual network functions (VNFs) of the communication system 100 shown in FIG. 1. In various examples, the network device 300 may be a specialized computer, a personal or laptop computer (PC), a tablet PC, a mobile telephone, a smartphone, a portable radio, a network router, switch or bridge, or any machine capable of executing instructions (sequential or otherwise) that specify actions to be taken by that machine. In some embodiments, the network device 300 is a cloud-based electronic computing device implemented by one or more electronic processors located at the same or different locations.

In some embodiments, the network device 300 may include various components connected by a digital data transfer bus 312. In the example illustrated, the network device 300 is an electronic computing device that includes a second electronic processor 302, a second memory 304, and a second network interface 310. These components are similar to those described above with respect to the communication device 105, 110 and perform similar general functions. In some embodiments, the second network interface 310 may enable the network device 300 to communicate data and control information with other devices via wired or wireless communication. Second network interface 310 may connect to a one or more of a plurality of networks that may facilitate access to "event Triggered" data or, alternatively, access networks that are continuously generating data while autonomously operating within an Internet-of-Things (IoT) system network (not shown).

In some embodiments, the network device 300 may further include one or more sensors 306, such as one or more of an accelerometer, a gyroscope, a global positioning system (GPS) sensor, a thermometer, a magnetometer, a barometer, a pedometer, a proximity sensor, a chemical specific vapor sensor, a radiation sensor, and an ambient light sensor, among others. Sensors 306 may include some, all, or none of one or more of the types of sensors above (although other types of sensors may also be present), as well as one or more sensors of each type.

Sensors 306 may be used in conjunction with one or more user input/output (I/O) devices 308. User I/O devices 308 may include one or more of a PTT button, a display, a camera, a speaker, a keyboard, a microphone, a mouse (or other navigation device), or a fingerprint scanner, among others. User I/O devices 308 may include some, all, or none of one or more of the types of I/O devices above (although other types of I/O devices may also be present), as well as one or more I/O devices of each type.

The network device 300 may include different specific elements depending on the particular device. For example, although not shown, in some embodiments the network device 300 may include a front end that incorporates a millimeter and sub-millimeter wave radio front end module integrated circuit (RFIC) connected to the same or different antennas than each other. The RFICs may include processing circuitry that implements processing of signals for the desired protocol (e.g., medium access control (MAC), radio link control (RLC), packet data convergence protocol (PDCP), radio resource control (RRC) and non-access stratum (NAS) functionality) using one or more processing cores to execute instructions and one or more memory structures to store program and data information. The RFICs may further include digital baseband circuitry, which may implement physical layer functionality (such as hybrid automatic repeat request (HARM) functionality and encoding/decoding, among others), transmit and receive circuitry (which may contain digital-to-analog and analog-to-digital converters, up/down frequency conversion circuitry, filters, and amplifiers, among others), and RF circuitry with one or more parallel RF chains for transmit/receive functionality (which may contain filters, amplifiers, phase shifters, up/down frequency conversion circuitry, and power combining and dividing circuitry, among others), as well as control circuitry to control the other RFIC circuitry.

As indicated above, one or more of the network devices 300 shown in FIG. 1 may be implemented, not by physical implementations, but by virtual network functions (VNFs). VNFs have taken on increasing significance due to the increasing complexity of the 5G network. In particular, it may be costly or difficult, at best, to update or replace physical network devices when the functionality of the network devices 300 (such as the mobility management entity (MME) and serving and packet data gateways in LTE and 5G architectures and the Access and Mobility Management Function (AMF) and Session Management Function (SMF) in 5G architectures) is to be altered. Software may thus be used to permit general purpose computers in a centralized or distributed manner to provide one or more network functions as one or more VNFs of a Network Function Virtualization (NFV) architecture.

In some embodiments, NFV architecture may include physical components that implement virtualized components with different functionality. An NFV architecture may be implemented by, for example, a data center comprising one or more servers accessible "in the cloud." An NFV architecture may include one or more physical devices and multiple applications hosted on one or more platforms. These platforms may include, among others, a localized platform, such as a server, or a distributed platform, such as a cloud computing platform or other distributed computing platforms.

In some embodiments, the network device 300 may include fewer or additional components in configurations different from that illustrated in FIG. 3 (e.g., depending on the type of network device 300). For example, in some embodiments, the network device 300 may not include the sensors 306 or the user I/O devices 308. In some embodiments, the network devices 300 perform additional functionality than the functionality described herein. In some embodiments, one or more network devices 300 communicate with other devices of the communication system 100 to control and/or influence operation thereof as explained in greater detail below.

Figure 4:
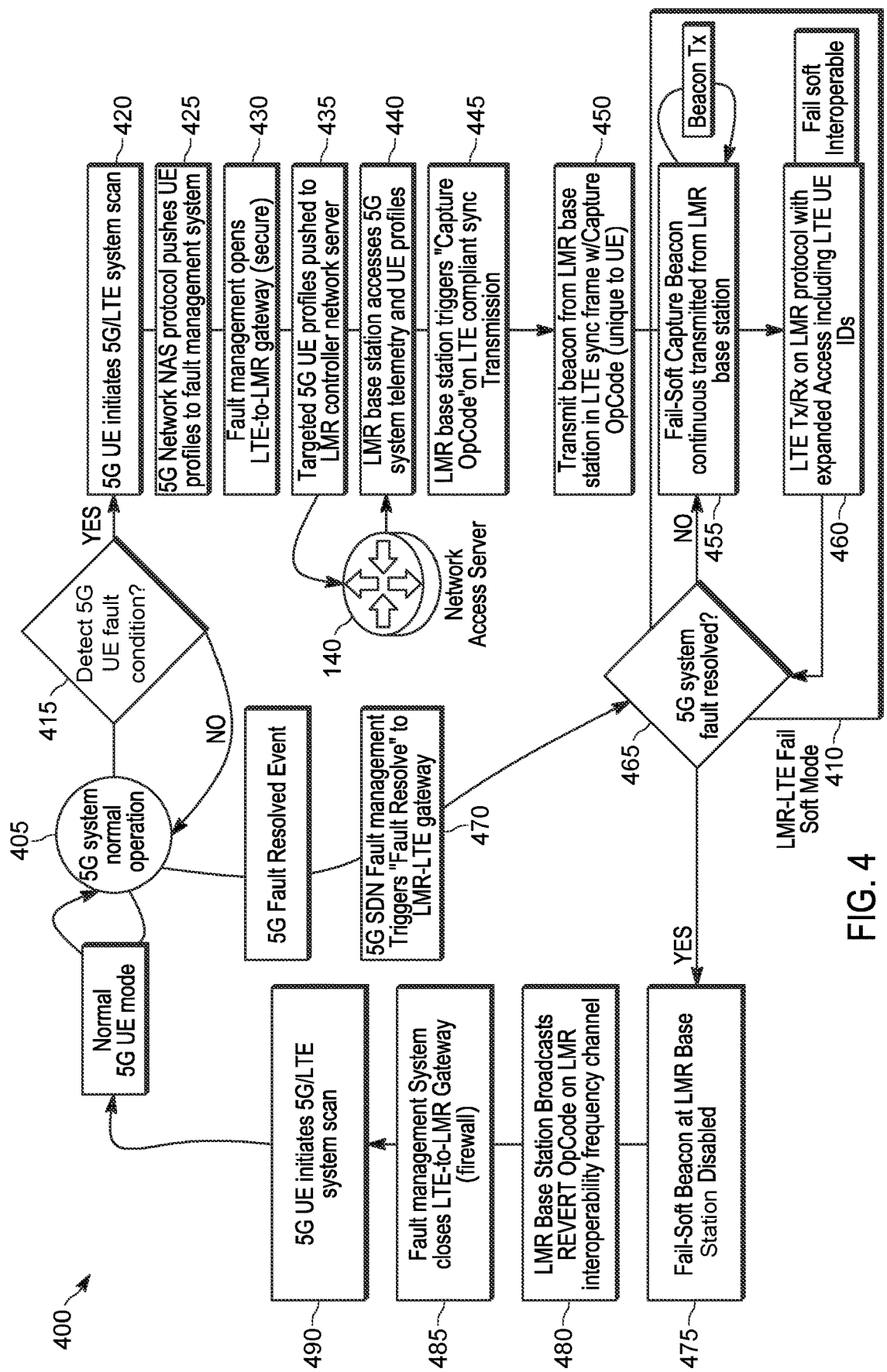
FIG. 4 illustrates a flow diagram that shows various steps taken by various devices of the communication system of FIG. 1 to control communication occurring through the communication system of FIG. 1 according to one example embodiment.

FIG. 4 illustrates a flow diagram 400 that shows various steps taken by various devices of the communication system 100 to control whether the 5G/LTE communication devices 105 communicate with other devices in a normal operating mode 405 over a 5G/LTE communication network or in an LMR-LTE fail soft operating mode 410 over an LMR communication network. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure.

At block 405, the 5G/LTE communication devices 105 communicate with other devices in a normal operating mode 405 over a 5G/LTE communication network. For example, communication between communication devices 105 occurs according to the 5G/LTE communication protocol via wireless signaling between the 5G/LTE base stations 125 and the 5G/LTE communication devices 105. In some embodiments, characteristics of communication defined by the 5G/LTE protocol includes an operating radio frequency (RF) spectrum for the 5G/LTE communication network, physical resource block bandwidth, sub-channel partitioning, sync symbol timing, and sub-frame timing. For example, the 5G/LTE communication protocol defines interleaved time domain time-division-multiplexing (TDM) time slots (i.e., multiple sub-frames include specific slots in the time domain TDM structure) distributed over multiple frequency domain sub-channels (i.e., multiple frequency specific sub-channels including individual sub-carriers that may be concatenated to form a physical resource block, where multiple resource blocks are allocated within the 5G/LTE contiguous operating band). A physical resource block may span 180 kHz of spectrum, and a sub-channel may span 15 khz of spectrum included within the resource block. These interleaved time domain TDM time slots distributed over multiple frequency domain sub-channels may be utilized such that sync symbols, user identification data, and payload data specific to a particular communication device 105 enables said device to gain access to, and operate in conjunction with, the 5G/LTE base station 125 of the 5G/LTE communication network.

This above-described information may be referred to as a sync symbol, frame timing, and resource block assignments that are individually associated with each 5G/LTE communication device 105. In other words, the sync symbol, frame timing, and resource block assignments may be different for each 5G/LTE communication device 105 such that each 5G/LTE communication device 105 is interleaved in time and frequency with other 5G/LTE communication devices 105 in order to realize tandem access to the 5G/LTE base station 125 without interference between individual 5G/LTE communication devices 105.

At block 415, the 5G/LTE software defined network 145 is configured to execute a fault detection protocol to detect a fault condition of the 5G/LTE communication network (i.e., a first 5G/LTE communication network). In some embodiments, the 5G/LTE software defined network 145 is configured to monitor the 5G/LTE base stations 125 of the 5G/LTE communication network to ensure that they are functioning properly. For example, the 5G/LTE software defined network 145 may receive status information from each of a plurality of 5G/LTE base stations 125 to determine whether a fault condition has occurred at any of the 5G/LTE base stations 125. As an example, a fault condition may occur when a portion of the 5G/LTE base station 125 (e.g., an electrical transformer without a back-up transformer) is damaged (e.g., by wind, lightning, or other weather occurrence). As another example, a fault condition may occur due to an operator, maintenance, or construction error at the 5G/LTE base station 125 that causes, for example, a blown fuse or power transient damage to a transceiver subsystem within a particular 5G/LTE base station 125, where such damage may not be repairable for an extended period of time. As another example, a fault condition may occur when someone intentionally damages/disables a portion of the 5G/LTE base station 125 such that the 5G/LTE base station 125 cannot properly function. As yet another example, a fault condition may occur when one or more 5G/LTE communication devices 105 are outside the first 5G/LTE communication network coverage area. In some embodiments, sync loss experienced by one or more 5G/LTE communication devices 105 may be indicative of a fault condition of the 5G/LTE communication network.

In some embodiments, the status information from a base station 125 may indicate that the base station 125 is experiencing one of the above example fault conditions (e.g., as sensed by the base station 125 using sensors at the base station 125). In other embodiments, the absence of scheduled status information from a base station 125 may indicate that the base station 125 is experiencing a fault condition (e.g., because the base station 125 is unable to transmit status information as scheduled). Additionally, the 5G/LTE software defined network 145 may determine that the 5G/LTE communication network is experiencing a fault condition based on determining that one or more 5G/LTE communication devices 105 are outside of a coverage area of any 5G/LTE base stations 125. In such situations, the fault condition may not necessarily indicate any damaged or malfunctioning 5G/LTE network equipment at, for example the base stations 125.

When the 5G/LTE software defined network 145 determines that a fault condition is not occurring at any of the 5G/LTE base stations 125 or in general on the 5G/LTE communication network, the 5G/LTE communication devices 105 continue to communicate with other devices in the normal operating mode 405 over the 5G/LTE communication network. On the other hand, when the 5G/LTE software defined network 145 determines that a fault condition is occurring on the 5G/LTE communication network, the flow diagram 400 proceeds from decision block 415 to block 420 where the devices of the communication system 100 begin transitioning the 5G/LTE communication devices 105 affected by the fault condition to communicate in an LMR-LTE fail soft operating mode 410 over an LMR communication network.

When the fault condition of the 5G/LTE communication network occurs, at block 420, the 5G/LTE communication devices 105 affected by the fault condition initiate and engage in a 5G/LTE network scanning process to attempt to identify and acquire a second operational 5G/LTE communication network while the first 5G/LTE communication network is experiencing the fault condition. In some embodiments, such a network scanning process is part of the 5G/LTE communication protocol and is programmed into the first memory 210 of the 5G/LTE communication device 105 to be executed by the first electronic processor 205. In some embodiments, each 5G/LTE communication device 105 may engage in the network scanning process according to a unique sync symbol and frame timing associated with a physical resource block as explained previously herein.

Also as explained previously herein, in some embodiments, the 5G/LTE communication devices 105 may be configured to communicate with each other solely through the 5G/LTE communication network. Consequently, the 5G/LTE communication devices 105 may not be configured to communicate directly with each other (i.e., device-to-device communication) without the communication being routed through a 5G/LTE base station 125. When the 5G/LTE communication network is experiencing a fault condition that prevents a 5G/LTE base station 125 from communicating with the 5G/LTE communication device 105, the 5G/LTE communication device 105 may continuously engage in the 5G/LTE network scanning process in an attempt to identify another 5G/LTE communication network at block 420. While scanning for functional 5G/LTE networks at block 420, the 5G/LTE communication device 105 may not communicate to other types of non-5G/LTE networks or other types of alternative networks such as an LMR communication network while configured for normal 5G/LTE operations.

Accordingly, at block 430, in response to detecting the fault condition of the first 5G/LTE communication network, the software defined network 145 establishes the background gateway communication channel 150 between the 5G/LTE network and the LMR communication network. The background gateway communication channel 150 may be established directly between the 5G/LTE network controller 130 and the LMR network controller 135 or the network access server 140. Alternatively, the background gateway communication channel 150 may be established between the 5G/LTE network controller 130 and the LMR network controller 135 or the network access server 140 via the software defined network 145. In some embodiments, the software defined network 145 may disable a firewall between the 5G/LTE network controller 130 and the LMR network controller 135 or the network access server 140 before establishing the background gateway communication channel 150. In some embodiments, the background gateway communication channel 150 is a secure communication channel that, for example, follows a public key system to ensure secure transactions. As explained previously herein, the background communication channel 150 may be a wireless or wired connection/communication channel.

At block 425 (which may be performed before or after block 430), the software defined network 145 receives profile information of 5G/LTE communication devices 105 from the 5G/LTE network controller 130. For example, a Non-Access Stratum (NAS) protocol of the 5G/LTE network controller 130 may facilitate communication of the profile information of the 5G/LTE communication devices 105 to the software defined network 145.

At block 435, the profile information of targeted/affected 5G/LTE communication devices 105 (i.e., a plurality of 5G/LTE communication devices 105 affected by the fault condition) is transmitted to the network access server 140 (as shown in FIG. 4) or to the LMR network controller 135 via the background gateway communication channel 150. In embodiments that include the network access server 140, transmitting the profile information to the network access server 140 and storing the profile information of the 5G/LTE devices 105 separately from the profile information of the LMR communication devices 110 provides an added level of security and access control for the profile information so as to ensure that secure/non-secure communication partition control (as dictated by some public safety communication networks) is preserved, and communication talk group integrity is maintained.

In some embodiments, the profile information includes identification information, connection information, and/or the like. For example, the profile information may include a sync symbol and frame timing for each affected 5G/LTE communication device 105 such that the information regarding the physical resource block that each affected 5G/LTE communication device 105 is configured to scan is temporarily stored by the LMR communication network. In addition, the profile information may include wireless technology, frequency band, channel capability/configuration, unit ID, secure key sequences, registration identification data, resource block assignments, or any other information specific to an individual 5G/LTE mobile device 105 as would be necessary for a particular 5G/LTE communication device 105 to be recognized by the 5G/LTE communication network and register with the 5G/LTE network to begin normal 5G/LTE operations. Accordingly, the capture beacon (described below with respect to block 445 and 450 of FIG. 4) may be configured to be within each 5G/LTE communication device's 105 capability and configuration.

In some embodiments, the 5G/LTE network controller 130 or the software defined network 145 determines which 5G/LTE communication devices 105 are affected by the fault condition based on location information or base station 125 information associated with each 5G/LTE communication device 105. For example, the 5G/LTE network controller 130 or the software defined network 145 may keep track of an approximate location of each 5G/LTE communication device 105. As another example, the 5G/LTE network controller 130 or the software defined network 145 may keep track of the most recent base station 125 that was used to relay a communication to or from each 5G/LTE communication device 105. When a certain base station 125 experiences a fault condition, the 5G/LTE network controller 130 or the software defined network 145 may determine that nearby 5G/LTE communication devices 105 and 5G/LTE communication devices 105 that recently used the base station 125 are likely to be affected by the fault condition.

At block 440, an LMR base station 120 receives the profile information of the plurality of 5G/LTE communication devices 105 from the network access server 140 or the LMR network controller 135. In some embodiments, the software defined network 145 is configured to detect the fault condition of the first 5G/LTE communication network by determining that an 5G/LTE base station 125 of the plurality of 5G/LTE base stations 125 is not functioning properly. In such situations, the software defined network 145 may determine a location of the 5G/LTE base station 125 that is not functioning properly. In some embodiments, the software defined network 145 may identify a designated LMR base station 120 that should receive the profile information of the plurality of 5G/LTE communication devices 105. The LMR base station 120 may be identified/selected based on one or more of a plurality of considerations including, but not limited to, proximity, coverage area, multi-path distortion response, and/or base station availability of the designated LMR base station 120, each of which may be evaluated with respect to the location of the LTE base station 125 that is not functioning properly. For example, the software defined network 145 may identify one or more LMR base stations 120 that include a coverage area 115 that overlaps with or is adjacent to a coverage area of the 5G/LTE base station 125 that is not functioning properly. The software defined network 145 may then transmit an identification of the identified LMR base station 120 to the LMR network controller 135. In other embodiments, the software defined network 145 may provide the location of the 5G/LTE base station 125 that is not functioning properly to the LMR network controller 135. In such embodiments, the LMR network controller 135 may determine one or more LMR base stations 120 that include a coverage area 115 that overlaps with or is adjacent to a coverage area of the 5G/LTE base station 125 that is not functioning properly.

At blocks 445 and 450, in response to receiving the profile information of the plurality of 5G/LTE communication devices 105, the designated LMR base station 120 may be configured to broadcast a capture beacon based on the profile information and compliant with at least some characteristics of a 5G/LTE communication protocol used by the 5G/LTE base station 125 to communicate with the 5G/LTE communication devices 105. In some embodiments, the capture beacon is configured to be received by the 5G/LTE communication devices 105 to reconfigure the 5G/LTE communication devices 105 for communication compliant with an LMR communication protocol. Accordingly, the capture beacon may be configured to be within each communication device's 105 capability and configuration, where sync symbols and frame timing requirements may be defined by the 5G/LTE protocol standards and resource block allocation is assigned by, or negotiated with, the base station 120 following the protocol.

For example, as explained with respect to block 420, the 5G/LTE communication devices 105 may be configured to initiate a 5G/LTE network availability scanning process to attempt to identify another 5G/LTE network when the 5G/LTE network is experiencing the fault condition. In some embodiments, this network scanning process may occur according to characteristics of the 5G/LTE communication protocol. For example, each 5G/LTE communication devices 105 may perform a network scanning process according to its own wireless technology, frequency band and channel capability/configuration, and 5G/LTE protocol specific sync symbol/timing signaling. Therefore, 5G/LTE communication devices 105 may be scanning for base station signals that include, for example, certain sync symbol formatting and timing, as well as frequency band spectral characteristic, so that resource block allocations may be assigned or negotiated with the base station 125 in accordance with the 5G/LTE protocol. Thus, an LMR base station 120 without knowledge of the individual requirements for which each 5G/LTE communication device 105 is scanning may not be able to successfully communicate with the 5G/LTE communication device 105. However, the profile information of the plurality of 5G/LTE communication devices 105 received by the LMR base station 120 allows the LMR base station 120 to broadcast capture beacons including unit ID, synchronization signaling, and resource block assignments customized to specific 5G/LTE communication devices 105, where said capture beacons are compliant with at least some characteristics of the 5G/LTE communication protocol. This beacon broadcasting strategy enables the 5G/LTE communication devices 105 to recognize the capture beacon signaling from the LMR base station 120 while the 5G/LTE communication devices 105 are searching for an available 5G/LTE network (e.g., while 5G/LTE network is in a fault condition). This beacon broadcasting strategy also enables the 5G/LTE communication devices 105 to properly decode the associated payload data included in the capture beacons.

In some embodiments, the capture beacons include an operation code within the beacon payload data that indicates that the first 5G/LTE communication network has experienced the fault condition. In some embodiments, the operation code of each capture beacon is unique to a specific 5G/LTE communication device 105.

At block 455, the 5G/LTE communication device 105 receives the capture beacon from the LMR base station 120 during the 5G/LTE network scanning process (initiated at block 420). In some embodiments, at block 455, the LMR base station 120 may continuously transmit capture beacon signaling that is targeted to those 5G/LTE communication devices 105 that were affiliated with the 5G/LTE network that previously experienced a fault condition. In other embodiment, at block 455, the LMR base station 120 may transmit capture beacons targeting a particular 5G/LTE communication device 105 until said device 105 synchronizes and accesses the LMR base station 120, at which time the beacon transmissions associated with that device 105 may cease. Transmission of the capture beacons, or attempts to otherwise capture 5G/LTE communication devices 105, may continue until the 5G/LTE system fault condition has been resolved as determined at block 465.

Following block 455, in response to receiving the capture beacon and identifying the operation code that indicates that the first 5G/LTE communication network has experienced the fault condition, at block 460, the 5G/LTE communication device 105 may reconfigure itself to engage in wireless voice communication with another 5G/LTE communication device 105, with an LMR communication device 110, or both using the LMR communication protocol instead of the 5G/LTE communication protocol. Accordingly, at block 460, the LMR communication network that operates according to the LMR protocol is configured to transmit and receive communications to provide expanded access to not only the LMR communication devices 110, but also the 5G/LTE communication devices 105 that have reconfigured themselves to use the LMR communication protocol instead of the 5G/LTE communication protocol. To reconfigure itself to use the LMR communication protocol instead of the 5G/LTE communication protocol, the 5G/LTE communication device 105 may include a fail-soft application (including a state machine) that is executed by the first electronic processor 205. In some embodiments, the fail-soft application is de-embedded from a 5G/LTE layer included the first memory 210 of the 5G/LTE communication device 105. The first electronic processor 205 executing the fail-soft application may be configured to recognize and identify the operation code included in the capture beacon.

As an example of the functionality of the fail-soft application of a specific 5G/LTE communication device 105, the operation code included in the capture beacon may "down select" the specific 5G/LTE communication device 105 to, for example, a 180 kilohertz channel "talk-around" (i.e., direct device-to-device communication between the 5G/LTE communication device 105 and other communication devices 105/110 as explained in greater detail below) in the LMR spectrum or a 180 kilohertz "repeater mode" through the LMR communication network (i.e., communication between the 5G/LTE communication device 105 and other communication devices 105/110 via the LMR base station 120 as explained in greater detail below). In some embodiments, the "repeater mode" may use frequencies in the 5G/LTE spectrum of the first 5G/LTE communication network since it is known that the 5G/LTE spectrum is unoccupied given that the 5G/LTE network is experiencing a fault condition. For example, 180 kilohertz is a bandwidth defined in the 5G/LTE physical resource block. The 180 kilohertz bandwidth may represent a practical example where the first network interface 215 (implemented as an 5G/LTE RF transceiver) of the 5G/LTE communication device 105 can be used in LMR mode to take advantage of the fact that its predefined subcarriers have the 180 kilohertz bandwidth. In some embodiments, use of the 180 kilohertz bandwidth allows the 5G/LTE communication device 105 to communicate according to the LMR protocol while maintaining at least some compatibility with the 5G/LTE protocol. In some embodiments, whether the fail-soft application "down selects" to the 5G/LTE spectrum or the LMR spectrum may be pre-programmed into the first memory 210. In some embodiments, the fail-soft application controls a graphical user interface of the 5G/LTE communication device 105 to display a PTT button that a user may actuate to in order to transmit voice data to other devices. For example, a virtual PTT button is displayed on a touchscreen of the 5G/LTE communication device.

At block 460, the down selected the 5G/LTE communication device 105 may be configured to engage in wireless voice communication with other 5G/LTE communication devices 105 that have been "down selected" in response to the capture beacon, and/or other, LMR communication devices 110, or both according to the LMR communication protocol. For example, the 5G/LTE communication device 105 communicates with other communication devices 105, 110 via direct device-to-device wireless communication using the LMR communication protocol, via wireless communication with the LMR base station 120, or both. In some embodiments, the 5G/LTE communication device 105 is configured to communicate according to the LMR communication protocol using constant envelope modulation (e.g., according to the P25 standard or frequency modulation (FM)).

Also at block 460, the LMR base station 120 is configured to operate according to the LMR communication protocol such that the LMR communication network serves as a backup communication network that allows the 5G/LTE communication device 105 to engage in wireless voice communication with another 5G/LTE communication device that has been "down selected" in response to the capture beacon, with LMR communication devices 110, or both. In some situations where the 5G/LTE communication device 105 communicates through the LMR base station 120, the LMR base station 120 may operate as a repeater base station. In repeater mode operation, base station 120 may receive "inbound" voice communication from the 5G/LTE communication device 105 on the 5G/LTE spectrum (which is not being used due to the 5G/LTE communication network fault condition) in compliance with the "down selected" LMR protocol (e.g., narrow band channel with constant envelope modulation signaling, where the narrow band channel may have a bandwidth range between, for example, 15 kHz to 180 kHz depending on the capability of communication device 105) and re-broadcast the inbound voice communication via an "outbound" transmission to a destination communication device 110 in compliance with standard LMR protocols. Alternatively, when in repeater mode, base station 120 may receive "inbound" voice communication from the LMR communication device 110 on the LMR allocated spectrum (e.g., per standard LMR protocol operations) and re-broadcast the inbound voice communication via an "outbound" transmission to a destination communication device 105 on the 5G/LTE spectrum in compliance with the "down selected" LMR protocol (e.g., 180 kHz bandwidth with constant envelope modulation signaling). In this way, the LMR base station 120 may be configured to transpose "down selected" 180 kilohertz voice data between the 5G/LTE communication device 105 and the LMR communication device 110 so as to create a communication link between communication devices 105 and 110. In some embodiments, the transposed outbound voice data transmitted by the LMR base station 120 to an LMR communication device 110 is transmitted according to the P25 protocol (e.g. 12.5 kHz channel bandwidth). As another example, the LMR base station 120 is configured to rebroadcast inbound voice data from the LMR communication device 110 according to the P25 protocol to outbound voice data transmission targeting "down selected" 180 kilohertz channels of the 5G/LTE communication devices 105. As yet another example, the 5G/LTE mobile communication devices 105 may be "down selected" to operate in the LMR spectrum (not the 5G/LTE spectrum), and the LMR base station 120 may be configured to respond to the 5G/LTE communication devices 105 in accordance with standard LMR protocols such as trunking, DMR, or the like. In this configuration, the 5G/LTE communication devices 105 may operate most similar to the LMR communication devices 110, including direct "talk around" operations where communication devices 105, 110 may communicate directly with other communication devices 105, 110 without the intervention of the LMR base station 120 (i.e., direct device-to-device communication).

In some embodiments, the LMR-LTE fail soft operation mode 410 provides backup communication capability for the 5G/LTE communication devices 105 when the 5G/LTE communication network is experiencing a fault condition. However, the LMR-LTE fail soft operation mode 410 may not be fully compliant to the 5G/LTE communication protocol and/or to the LMR communication protocol with respect to audio distortion, signal-to-noise ratio, or the like. Additionally, in some embodiments, the LMR-LTE fail soft operation mode 410 may only allow for voice communication between communication devices 105, 110 as opposed to higher data-rate types of data communication that may be allowed over the 5G/LTE communication network (e.g., video data communication or the like). Nevertheless, the communication system 100 may provide intelligible backup communication of voice data for 5G/LTE communication devices 105 when the 5G/LTE communication network is experiencing a fault condition.

As indicated in block 455, in some embodiments, the capture beacons may be recursively and continuously transmitted by the LMR base station 120 until the fault condition of the first 5G/LTE communication network is resolved. Continuous transmission of capture beacons may increase the probability that the 5G/LTE communication devices 105 receive at least one capture beacon from the LMR base station 120 because LMR coverage areas 115 may be quite large and a goal of the communication system 100 is to provide some level of communication capability to 5G/LTE communication devices 105 when the 5G/LTE communication network is experiencing a fault condition. Additionally, a 5G/LTE communication device 105 may receive a capture beacon but then may travel outside of the LMR coverage area 115. Because there may not be handoffs between LMR base stations 120 in the LMR-LTE fail soft operation mode 410, the LMR base station 120 may not be aware of when the 5G/LTE communication device 105 leaves or enters the LMR coverage area 115. Accordingly, recursive and continuous transmission of the capture beacons helps to ensure that all nearby 5G/LTE communication devices 105 have at least some minimum level of communication capability when the 5G/LTE communication network is experiencing a fault condition.

At block 465, the LMR base station 120 determines whether it has received an indication that the fault condition of the 5G/LTE communication network has been resolved. In some embodiments, the software defined network 145 determines whether the fault condition has been resolved in a similar manner as the software defined network 145 determines that the fault condition was present. For example, the software defined network 145 may receive a status update from a 5G/LTE base station 125 previously experiencing the fault condition. The status update may indicate that the fault condition has been resolved and that the base station 125 is now functioning properly. In response to determining that the fault condition has been resolved, at block 470, the software defined network 145 may transmit an indication to the LMR communication network (specifically, to the LMR base station 120) over the background gateway communication channel 150 indicating that the fault condition of the 5G/LTE communication network has been resolved.

At block 465, when the fault condition has not been resolved, the communication system continues operating in the LMR/LTE fail soft mode 410 at blocks 455 and 460. On the other hand, when the fault condition has been resolved, the flow diagram 400 proceeds to block 475 to exit the LMR/LTE fail soft mode 410 and begin a reversion process to revert back to 5G/LTE normal operation 405.

At block 475, in response to the fault condition of the first 5G/LTE communication network being resolved, the LMR base station 120 may be configured to cease broadcasting the capture beacons and, at block 480, broadcast a revert beacon based on the LMR communication protocol. In some embodiments, the revert beacon is configured to be received by the 5G/LTE communication device 105 operating in a previously configured "down convert" mode of operation to indicate that the 5G/LTE communication device 105 should revert back to the normal 5G/LTE communication operating mode to engage in wireless communication compliant with the 5G/LTE communication protocol. In some embodiments, the revert beacon includes a revert operation code configured to indicate that the fault condition of the first LTE communication network has been resolved.

In response to receiving the revert beacon and identifying the revert operation code, the fail-soft application running on the 5G/LTE communication device 105 may reconfigure the 5G/LTE communication device 105 to engage in wireless communication with the another 5G/LTE communication device 105, with the LMR communication device 110, or both using the 5G/LTE communication protocol instead of the LMR communication protocol. In other words, the 5G/LTE communication device 105 may cease communication according to the LMR communication protocol and resume in the 5G/LTE network scanning process to attempt to identify, and access, an operational 5G/LTE communication network according to the 5G/LTE communication protocol (at block 490). Because the first 5G/LTE communication network is no longer experiencing the fault condition and is functioning properly, the 5G/LTE base station 125 will communicate with the 5G/LTE communication device 105 according to the 5G/LTE communication protocol. Thus, the 5G/LTE communication devices 105 may revert back to communicating with other devices in a normal operating mode 405 over the first 5G/LTE communication network.

In some embodiments, the 5G/LTE communication device 105 may not re-initiate the 5G/LTE network scanning process in response to receiving the revert beacon from the LMR base station 120. Rather, while operating in the LMR-LTE fail soft mode 410, the 5G/LTE communication device 105 may be configured to continuously scan for functional 5G/LTE networks using 5G/LTE protocol compliant network scanning process in tandem with engaging in wireless voice communication using the LMR communication protocol. In other words, the 5G/LTE communication device 105 may continue to scan for the presence of a 5G/LTE communication network, for example, to determine whether the fault condition of the first 5G/LTE communication network has been resolved. In response to detecting a 5G/LTE communication network, the 5G/LTE communication device 105 may revert its operations back to using the 5G/LTE communication protocol to communicate with other devices. Thus, the fail-soft application running on the 5G/LTE communication device 105 may be configured to control the 5G/LTE communication device to prioritize the use of 5G/LTE communications when available and use LMR communications when a 5G/LTE communication network is not available. In some embodiments, the fail-soft application running on the 5G/LTE communication device 105 may be configured to control the 5G/LTE communication device 105 to prioritize the use of LMR communications until the capture beacon is disabled at block 475, in response to the fault condition of the first 5G/LTE communication network being resolved.

During the reversion process, at block 465, at block 470, or in association with blocks 475-485, in response to determining that the fault condition of the first 5G/LTE communication network has been resolved, the software defined network 145 may be configured to delete or instruct the LMR communication network to delete the profile information of the plurality of 5G/LTE communication devices 105 from the network devices 300 of the LMR communication network. For example, the 5G/LTE profile information is deleted from the LMR network controller 135, the network access server 140, and/or the LMR base station 120. Also in response to determining that the fault condition of the first 5G/LTE communication network has been resolved, the software defined network 145 may be configured to disable the background gateway communication channel 150 to the LMR communication network (at block 485). In some embodiments, the software defined network 145 may re-establish a firewall between the 5G/LTE communication network and the LMR communication network (at block 485) that may have been disabled when establishing the background gateway communication channel 150.

While FIG. 4 illustrates serial sequencing of process blocks 475, 480, 485 and 490, this representation is not meant to constrain such responses only to serial processing. For example, once a 5G/LTE handset 105 has received a revert opcode at block 480, it may begin a 5G/LTE system scan sequence at block 490 before the fault management controller 145 closes channel 150 (at block 485). In other words, some process blocks 475 to 490 may be executed in tandem with other blocks, or may even occur after the block order as illustrated in FIG. 4 (e.g., the fault management controller 145 closing the gateway 150 at block 485 may occur after all 5G/LTE devices 105 have completed their respective system scan sequences at block 490 and have resumed normal 5G/LTE handset operations at block 405).

Figure 5:
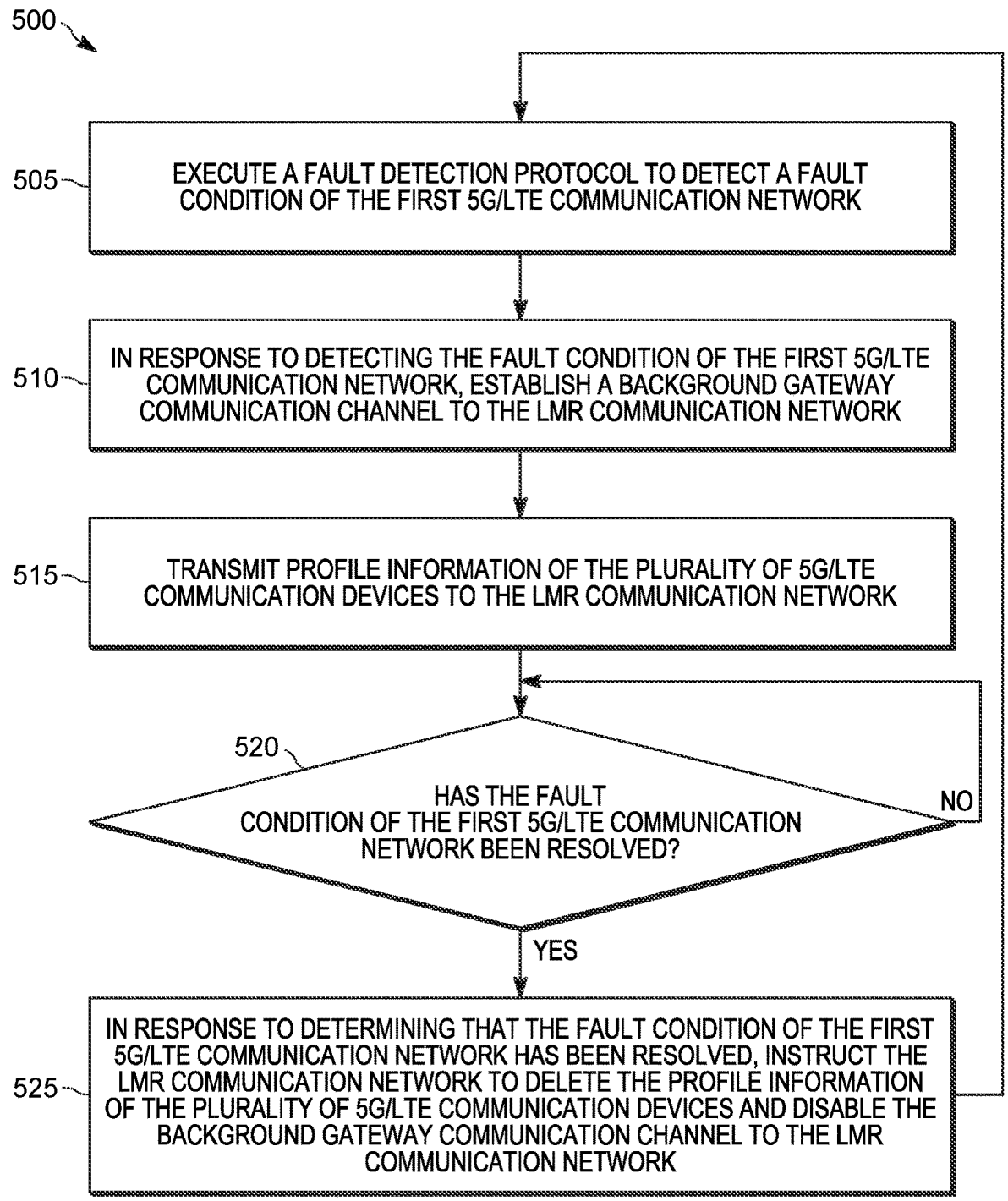
FIG. 5 is a flowchart of a method of controlling operation of the communication system of FIG. 1 that is performed by a 5G/LTE software defined network (e.g., fault management controller) according to one example embodiment.
Figure 6:
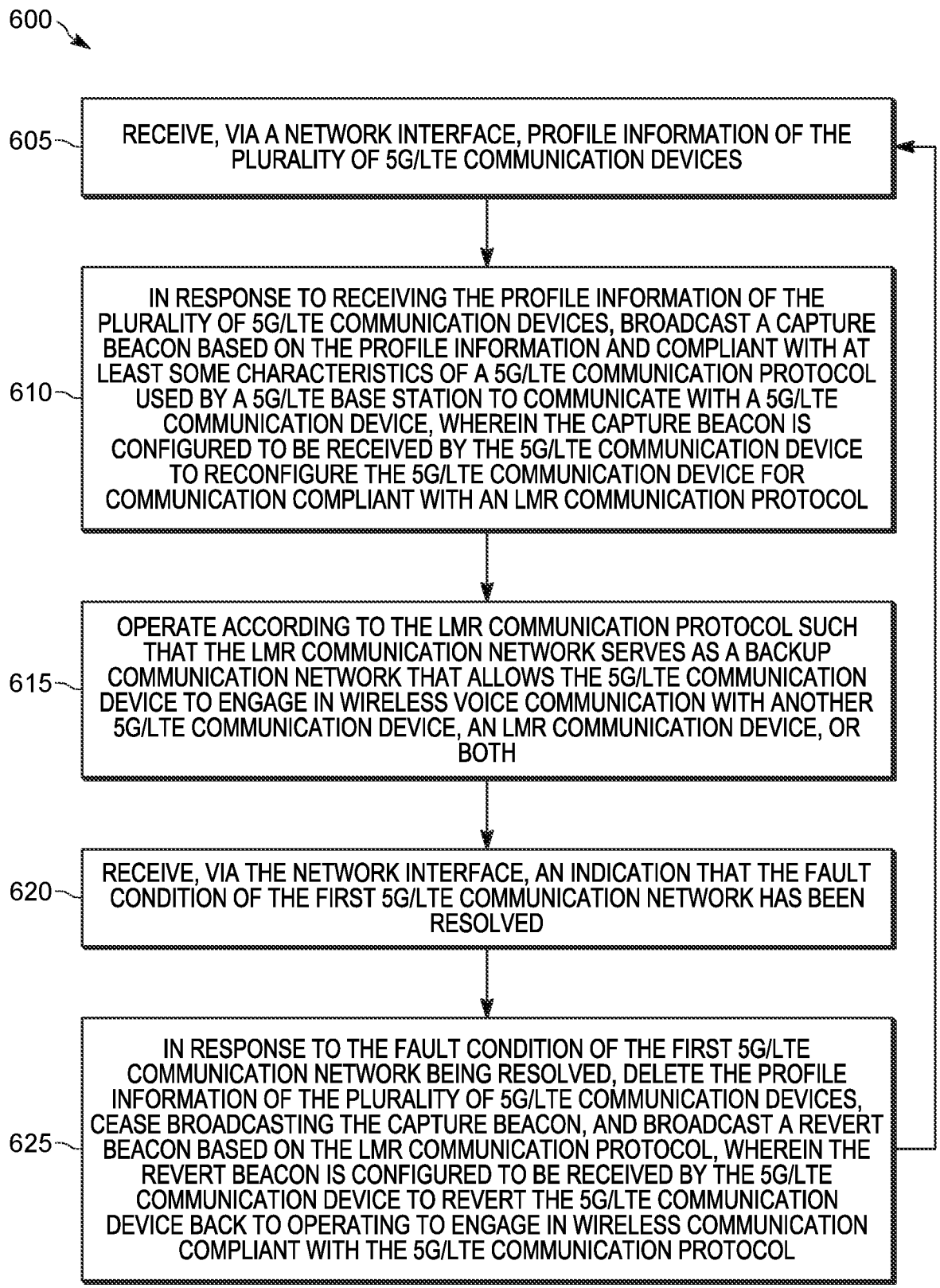
FIG. 6 is a flowchart of a method of controlling operation of the communication system of FIG. 1 that is performed by an LMR communication system including an LMR base station and an LMR network controller according to one example embodiment.
Figure 7:
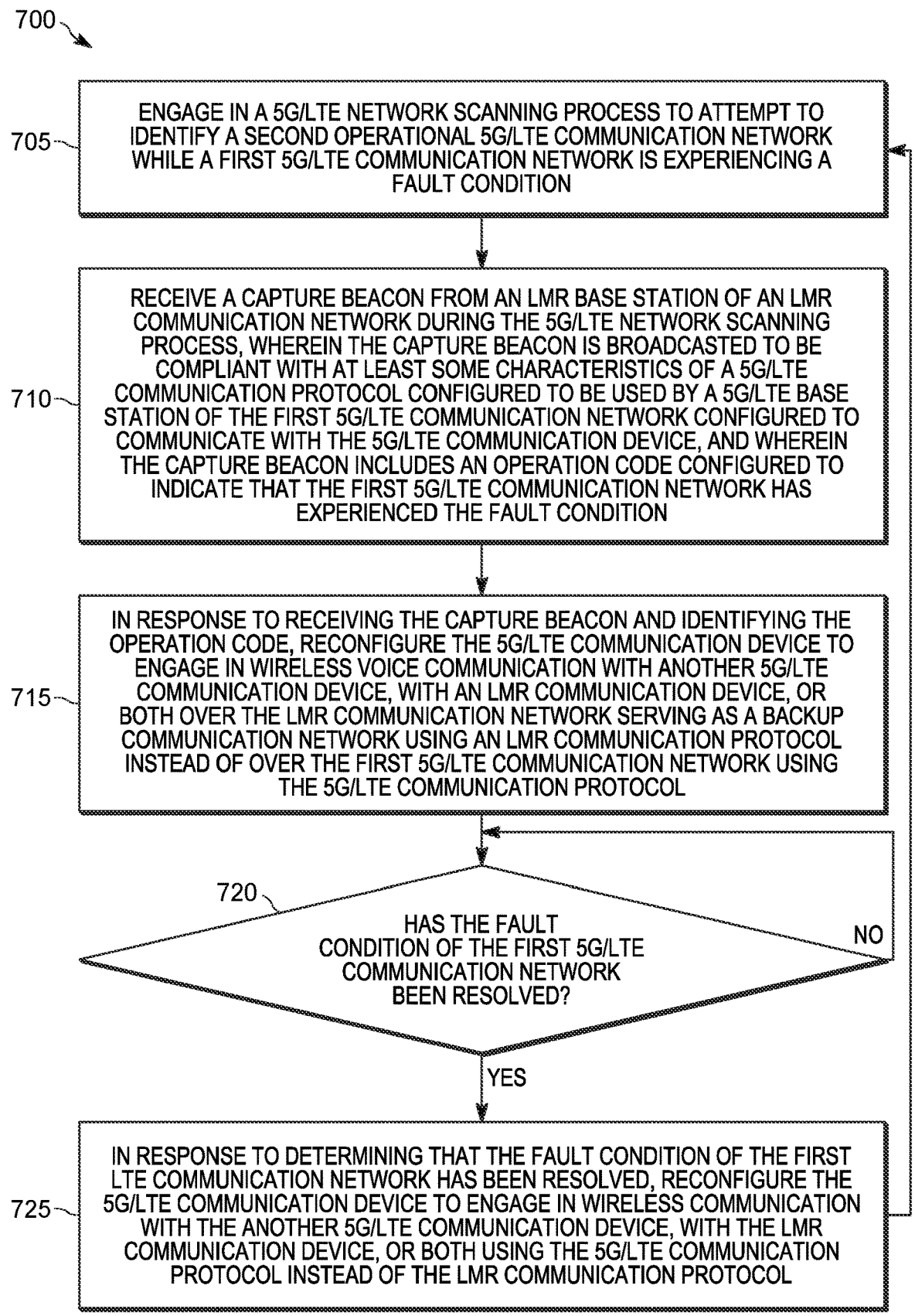
FIG. 7 is a flowchart of a method of controlling operation of a 5G/LTE communication device of the communication system of FIG. 1 that is performed by a first electronic processor of the 5G/LTE communication device according to one example embodiment.

FIGS. 5-7 are flowcharts of methods of operating the communication system 100 of FIG. 1 in the LMR-LTE fail soft mode 410 that are performed by various devices in the communication system 100 according to one example embodiment. The processes performed throughout each of the methods shown in FIGS. 5-7 are included in the system flow diagram 400 of FIG. 4 and have been explained previously herein with respect to FIG. 4. Accordingly, the methods of FIGS. 5-7 will be explained only briefly below with references back to corresponding blocks of the flow diagram 400. In some embodiments, the methods of FIGS. 5-7 are performed by an electronic processor of the device performing the respective method. While a particular order of processing steps, message receptions, and/or message transmissions is indicated in FIGS. 5-7 as an example, timing and ordering of such steps, receptions, and transmissions may vary where appropriate without negating the purpose and advantages of the examples set forth in detail throughout the remainder of this disclosure.

FIG. 5 is a flowchart of a method 500 of controlling operation of the communication system of FIG. 1 that is performed by the 5G/LTE software defined network 145 (i.e., the fault management controller 145) according to one example embodiment.

At block 505, the software defined network 145 is configured to execute a fault detection protocol to detect a fault condition of the first 5G/LTE communication network (similar to block 415 of FIG. 4). In response to detecting the fault condition of the first 5G/LTE communication network, the software defined network 145 is configured to establish a background gateway communication channel 150 to the LMR communication network (at block 510, which is similar to block 430 of FIG. 4), and transmit profile information of the plurality of 5G/LTE communication devices 105 to the LMR communication network (at block 515, which is similar to block 435 of FIG. 4).

At block 520, the software defined network 145 determines whether the fault condition of the first 5G/LTE communication network has been resolved (similar to block 465 of FIG. 4). When the fault condition has not been resolved, the method 500 remains at block 520 to continue monitoring whether the fault condition has been resolved. In response to determining that fault condition of the first 5G/LTE communication network has been resolved, at block 525, the software defined network 145 is configured to delete or instruct the LMR communication network to delete the profile information of the plurality of 5G/LTE communication devices 105 stored by network devices 300 of the LMR communication network (as described previously herein with respect to block 465, block 470, or in association with block 475-485 of FIG. 4) and disable the background gateway communication channel 150 to the LMR communication network (similar to block 485 of FIG. 4). As indicated in FIG. 5, the method 500 may proceed back to block 505 once normal operation of the 5G/LTE communication network has resumed in order to continue executing the fault detection protocol to detect another fault condition experienced by the 5G/LTE communication network.

FIG. 6 is a flowchart of a method 600 of controlling operation of the communication system of FIG. 1 that is performed by the LMR communication system, including base station 120 and LMR network controller 135, according to one example embodiment.

At block 605, the LMR communication network is configured to receive, via the background gateway communication channel (e.g., established at block 430), the profile information of the plurality of 5G/LTE communication devices 105 (similar to block 440 of FIG. 4). In some embodiments, the profile information of the plurality of 5G/LTE communication devices 105 is stored by one or more of the LMR base station 120, the LMR network controller 135, and the network access server 140. In response to receiving the profile information of the plurality of 5G/LTE communication devices 105, at block 610, the LMR base station 120 is configured to broadcast a capture beacon based on the profile information and compliant with at least some characteristics of a 5G/LTE communication protocol used by a 5G/LTE base station 125 to communicate with a 5G/LTE communication device 105 (similar to blocks 450 and 455 of FIG. 4). The capture beacon may be configured to be received by the 5G/LTE communication device 105 to reconfigure the 5G/LTE communication device 105 for communication compliant with an LMR communication protocol.

At block 615, the LMR base station 120 is configured to operate according to the LMR communication protocol such that the LMR communication network serves as a backup communication network that allows the 5G/LTE communication device 105 to engage in wireless voice communication with another 5G/LTE communication device 105 that has been "down selected" in response to the capture beacon, with an LMR communication device 110, or both (similar to block 460 of FIG. 4). Such operation allows the communication system 100 to operate in the LMR-LTE fail soft mode 410 of FIG. 4.

At block 620, the LMR base station 120 receives, via the background gateway communication channel 150, an indication that the fault condition of the first 5G/LTE communication network has been resolved. For example, in response to the LMR communication network receiving an indication that the fault condition of the first 5G/LTE communication network has been resolved (as explained previously herein with respect to block 465, 470 of FIG. 4), the LMR network controller 135 may forward the 5G/LTE fault-free status to the LMR base station 120.

At block 625, in response to the fault condition of the first 5G/LTE communication network being resolved, the LMR communication system may be configured to delete the profile information of the plurality of 5G/LTE communication devices 105 from the network devices 300 of the LMR communication network, cease broadcasting the capture beacon, and broadcast a revert beacon based on the LMR communication protocol (similar to blocks 475 and 480 of FIG. 4). The revert beacon may be configured to be received by the 5G/LTE communication device 105 to revert the 5G/LTE communication device 105 back to its normal operating state so as to facilitate wireless communication compliant with the 5G/LTE communication protocol. As indicated in FIG. 6, the method 600 may proceed back to block 605 to continue normal operation of the LMR base station 120 to support communication between LMR communication devices 110. The method 600 may be restarted by the software defined network 145 upon detection of another fault condition of the 5G/LTE communication network.

FIG. 7 is a flowchart of a method 700 of controlling operation of a 5G/LTE communication device 105 of FIG. 1 that is performed by the first electronic processor 205 of the 5G/LTE communication device 105 according to one example embodiment.

At block 705, the 5G/LTE communication device 105 is configured to engage in a 5G/LTE network scanning process to attempt to identify a second operational 5G/LTE communication network while a first 5G/LTE communication network is experiencing a fault condition (similar to block 420 of FIG. 4). At block 710, the 5G/LTE communication device 105 may receive a capture beacon from an LMR base station 120 of an LMR communication network during the 5G/LTE network scanning process (see blocks 455 and 460 of FIG. 4). The capture beacon being broadcasted from base station 120 may be compliant with at least some characteristics of a 5G/LTE communication protocol used by a 5G/LTE base station 125 of the first 5G/LTE communication network. The compliance to some portion of the 5G/LTE characteristics facilitates proper reception of the capture beacon by the 5G/LTE communication device 105 (coincident with block 450 of FIG. 4). Additionally, the capture beacon may include an operation code configured to indicate that the first 5G/LTE communication network has experienced the fault condition (see block 445 of FIG. 4).

In response to receiving the capture beacon and identifying the operation code, at block 715, the 5G/LTE communication device 105 may be reconfigured to engage in wireless voice communication with another 5G/LTE communication device 105 that has been "down selected" in response to the capture beacon, with an LMR communication device 110, or both over the LMR communication network serving as a backup communication network using an LMR communication protocol instead of over the first 5G/LTE communication network using the 5G/LTE communication protocol (see LMR-LTE fail soft operation mode 410 of FIG. 4).

At block 720, the 5G/LTE communication device 105 determines whether the fault condition of the first 5G/LTE communication network has been resolved. In some embodiments, the 5G/LTE communication device 105 makes this determination in response to receiving a revert beacon broadcasted from the LMR base station 120 and including a revert operation code that indicates that he fault condition of the first 5G/LTE communication network has been resolved (see block 480 of FIG. 4). Additionally or alternatively, while operating in the LMR-LTE fail soft mode 410 (at block 720), the 5G/LTE communication device 105 may be configured to continue engaging in the 5G/LTE network scanning process in parallel with engaging in wireless voice communication using the LMR communication protocol. In other words, the 5G/LTE communication device 105 may continue to scan for the presence of a 5G/LTE communication network, for example, to determine whether the fault condition of the first 5G/LTE communication network has been resolved.

When the fault condition has not been resolved, the method 700 remains at block 720 to continue monitoring whether the fault condition has been resolved. In response to determining that fault condition of the first 5G/LTE communication network has been resolved, at block 725, the 5G/LTE communication device 105 is configured to revert back to normal operations compliant with the 5G/LTE communication protocol instead of the LMR communication protocol. In other words, the 5G/LTE communication device 105 may release communication according to the LMR communication protocol and resume in the 5G/LTE network scanning process to attempt to identify an operational 5G/LTE communication network (similar to block 490 of FIG. 4). Thus, the fail-soft application running on the 5G/LTE communication device 105 may configure the 5G/LTE communication device 105 to prioritize the use of 5G/LTE communications when available and use LMR communications when a 5G/LTE communication network is not available. The method 700 may be restarted in the event of a subsequent fault condition within the 5G/LTE communication system, where upon the communication device 105 engages in a 5G/LTE network scanning process in an attempt to identity a second operational 5G/LTE communication network (see block 705).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A Land Mobile Radio (LMR) base station comprising:
    a network interface configured to communicate with a plurality of LMR communication devices; and
    an electronic processor coupled to the network interface, wherein the electronic processor is configured to
        receive, via the network interface, profile information of a plurality of fifth generation (5G)/Long Term Evolution (LTE) communication devices, and
        broadcast, via the network interface, a capture beacon based on the profile information and compliant with at least some characteristics of a 5G/LTE communication protocol used by a 5G/LTE base station to communicate with a 5G/LTE communication device, wherein the capture beacon is configured to be received by the 5G/LTE communication device to reconfigure the 5G/LTE communication device for communication compliant with an LMR communication protocol.

2. The LMR base station of claim 1, wherein the electronic processor is configured to operate according to the LMR communication protocol such that the LMR base station provides a backup communication network that allows the 5G/LTE communication device to engage in wireless voice communication with another 5G/LTE communication device, with an LMR communication device, or both.

3. The LMR base station of claim 1, wherein the 5G/LTE communication devices of the plurality of 5G/LTE communication devices are configured to engage in wireless communication with each other over a first 5G/LTE communication network including the 5G/LTE base station; and wherein the profile information of the plurality of 5G/LTE communication devices is transmitted by a 5G/LTE software defined network in response to the 5G/LTE software defined network detecting a fault condition of the first 5G/LTE communication network that indicates that 5G/LTE network coverage for one or more of the 5G/LTE communication devices is unavailable.

4. The LMR base station of claim 3, wherein the fault condition of the first 5G/LTE communication network is determined based on the one or more of the 5G/LTE communication devices being outside of a coverage area of any 5G/LTE base stations of the first 5G/LTE communication network.

5. The LMR base station of claim 3, wherein the fault condition of the first 5G/LTE communication network is determined based on the 5G/LTE base station not functioning properly.

6. The LMR base station of claim 1, wherein the at least some characteristics of the 5G/LTE communication protocol include at least one of the group consisting of an operating radio frequency (RF) spectrum for a 5G/LTE communication network including the 5G/LTE base station, physical resource block bandwidth, sub-channel partitioning, sync symbol timing, and sub-frame timing.

7. A method of controlling a Land Mobile Radio (LMR) base station, the method comprising:

receiving, with an electronic processor of the LMR base station via a network interface of the LMR base station, profile information of a plurality of fifth generation (5G)/Long Term Evolution (LTE) communication devices; and broadcasting, with the electronic processor and via the network interface, a capture beacon based on the profile information and compliant with at least some characteristics of a 5G/LTE communication protocol used by a 5G/LTE base station to communicate with a 5G/LTE communication device, the capture beacon being configured to be received by the 5G/LTE communication device to reconfigure the 5G/LTE communication device for communication compliant with an LMR communication protocol.

8. The method of claim 7, further comprising operating, with the electronic processor and the network interface, according to the LMR communication protocol such that the LMR communication base station provides a backup communication network that allows the 5G/LTE communication device to engage in wireless voice communication with another 5G/LTE communication device, with an LMR communication device, or both.

9. The method of claim 7, wherein the 5G/LTE communication devices of the plurality of 5G/LTE communication devices are configured to engage in wireless communication with each other over a first 5G/LTE communication network including the 5G/LTE base station; and wherein the profile information of the plurality of 5G/LTE communication devices is transmitted by a 5G/LTE software defined network in response to the 5G/LTE software defined network detecting a fault condition of the first 5G/LTE communication network that indicates that 5G/LTE network coverage for one or more of the 5G/LTE communication devices is unavailable.

10. The method of claim 9, wherein the fault condition of the first 5G/LTE communication network is determined based on the one or more of the 5G/LTE communication devices being outside of a coverage area of any 5G/LTE base stations of the first 5G/LTE communication network.

11. The method of claim 9, wherein the fault condition of the first 5G/LTE communication network is determined based on the 5G/LTE base station not functioning properly.

12. The method of claim 7, wherein the at least some characteristics of the 5G/LTE communication protocol include at least one of the group consisting of an operating radio frequency (RF) spectrum for a 5G/LTE communication network including the 5G/LTE base station, physical resource block bandwidth, sub-channel partitioning, sync symbol timing, and sub-frame timing.

13. A communication system comprising:

a first fifth generation (5G)/Long-Term Evolution (LTE) communication network including a 5G/LTE base station and a plurality of 5G/LTE communication devices;

a Land Mobile Radio (LMR) communication network including an LMR base station and a plurality of LMR communication devices; and a 5G/LTE software defined network implemented by a first electronic processor configured to transmit profile information of the plurality of 5G/LTE communication devices to the LMR base station;

wherein the LMR base station includes a second electronic processor configured to:

receive the profile information of the plurality of 5G/LTE communication devices, and in response to receiving the profile information of the plurality of 5G/LTE communication devices, broadcast a capture beacon based on the profile information and compliant with at least some characteristics of a 5G/LTE communication protocol used by the 5G/LTE base station to communicate with a 5G/LTE communication device, wherein the capture beacon is configured to be received by the 5G/LTE communication device to reconfigure the 5G/LTE communication device for communication compliant with an LMR communication protocol.

14. The communication system of claim 13, wherein the second electronic processor is configured to operate according to the LMR communication protocol such that the LMR base station provides a backup communication network that allows the 5G/LTE communication device to engage in wireless voice communication with another 5G/LTE communication device, with an LMR communication device, or both.

15. The communication system of claim 13, wherein the first electronic processor is configured to:

execute a fault detection protocol to detect a fault condition of a first 5G/LTE communication network including the 5G/LTE base station that indicates that 5G/LTE network coverage for one or more 5G/LTE communication devices of the plurality of 5G/LTE communication devices is unavailable; and in response to detecting the fault condition of the first 5G/LTE communication network, transmit the profile information of the plurality of 5G/LTE communication devices to the LMR base station.

16. The communication system of claim 15, wherein the fault condition of the first 5G/LTE communication network is determined based on the one or more of the 5G/LTE communication devices being outside of a coverage area of any 5G/LTE base stations of the first 5G/LTE communication network.

17. The communication system of claim 15, wherein the first electronic processor is configured to:
   detect the fault condition of the first 5G/LTE communication network by determining that the 5G/LTE base station is not functioning properly;
   determine a location of the 5G/LTE base station that is not functioning properly; and
   identify the LMR base station based on a proximity of the LMR base station to the location of the 5G/LTE base station that is not functioning properly.

18. The communication system of claim 13, wherein the at least some characteristics of the 5G/LTE communication protocol include at least one of the group consisting of an operating radio frequency (RF) spectrum for a 5G/LTE communication network including the 5G/LTE base station, physical resource block bandwidth, sub-channel partitioning, sync symbol timing, and sub-frame timing.

19. The communication system of claim 13, wherein the 5G/LTE communication device is configured to:
   engage in a 5G/LTE network scanning process to attempt to identify a second operational 5G/LTE communication network while a first 5G/LTE communication network including the 5G/LTE base station is experiencing a fault condition that indicates that 5G/LTE network coverage for one or more 5G/LTE communication devices of the plurality of 5G/LTE communication devices is unavailable;
   receive the capture beacon from the LMR base station during the 5G/LTE network scanning process, wherein the capture beacon includes an operation code configured to indicate that the first 5G/LTE communication network has experienced the fault condition; and
   in response to receiving the capture beacon and identifying the operation code, reconfigure the 5G/LTE communication device to engage in wireless voice communication with another 5G/LTE communication device, with a LMR communication device, or both using the LMR communication protocol instead of the 5G/LTE communication protocol.

20. The communication system of claim 19, wherein reconfiguring the 5G/LTE communication device to engage in wireless voice communication using the LMR communication protocol includes the 5G/LTE communication device displaying a virtual push-to-talk (PTT) button on a graphical user interface on a display of the 5G/LTE communication device, and
   wherein the 5G/LTE communication device is configured to transmit voice data to the another 5G/LTE communication device, to the LMR communication device, or both using the LMR communication protocol in response to the virtual PTT button being actuated.

* * * * *